(12) United States Patent
Yoshizawa et al.

(10) Patent No.: US 11,647,370 B2
(45) Date of Patent: May 9, 2023

(54) MOBILE INFORMATION TERMINAL, INFORMATION PRESENTATION SYSTEM AND INFORMATION PRESENTATION METHOD

(71) Applicant: MAXELL, LTD., Kyoto (JP)

(72) Inventors: Kazuhiko Yoshizawa, Oyamazaki (JP); Nobuo Masuoka, Oyamazaki (JP); Hideyuki Nagata, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 284 days.

(21) Appl. No.: 16/769,200

(22) PCT Filed: Feb. 16, 2018

(86) PCT No.: PCT/JP2018/005531
§ 371 (c)(1),
(2) Date: Jun. 2, 2020

(87) PCT Pub. No.: WO2019/159333
PCT Pub. Date: Aug. 22, 2019

(65) Prior Publication Data
US 2021/0160424 A1    May 27, 2021

(51) Int. Cl.
*G06F 16/538* (2019.01)
*G06T 11/00* (2006.01)
(Continued)

(52) U.S. Cl.
CPC ....... *H04N 5/23229* (2013.01); *G06F 16/538* (2019.01); *G06T 11/00* (2013.01); *H04W 4/023* (2013.01); *G06K 9/6215* (2013.01)

(58) Field of Classification Search
None
See application file for complete search history.

(56) References Cited

U.S. PATENT DOCUMENTS

2005/0076004 A1* 4/2005 Yanagisawa ............ G06F 16/58
                                                   707/E17.031
2008/0107361 A1* 5/2008 Asukai ............... A61B 5/02055
                                                         382/317
(Continued)

FOREIGN PATENT DOCUMENTS

JP    2005-108027 A    4/2005
JP    2008-118527 A    5/2008
(Continued)

OTHER PUBLICATIONS

International Search Report issued in corresponding International Patent Application No. PCT/JP2018/005531, dated May 15, 2018, with English translation.

*Primary Examiner* — David H Chu
(74) *Attorney, Agent, or Firm* — McDermott Will & Emery LLP

(57) ABSTRACT

When storing captured image data in an information server, a mobile information terminal transmits related information (date and time information, location information, direction angle information, information of a distance to a subject, and user identification information) at the time of imaging to the information server. In addition, when making a request for the image data stored in the information server, current terminal information and image search conditions describing image data replay conditions are transmitted to the information server. The information server searches for corresponding image data based on the current terminal information and the image search conditions and transmits the corresponding image data to the mobile information terminal. The mobile information terminal displays the received image data on the display unit as a related image. Therefore, a user can effectively recall the memories, such as a situation or impression at the time of imaging.

6 Claims, 14 Drawing Sheets

(51) Int. Cl.
   *H04N 5/232*   (2006.01)
   *H04W 4/02*    (2018.01)
   *G06K 9/62*    (2022.01)

(56) References Cited

U.S. PATENT DOCUMENTS

| | | | | |
|---|---|---|---|---|
| 2011/0145574 A1* | 6/2011 | Ju | ............ | H04N 7/185 |
| | | | | 726/28 |
| 2013/0325870 A1* | 12/2013 | Rouse | ............ | G06F 16/41 |
| | | | | 707/741 |
| 2015/0355463 A1* | 12/2015 | Sako | ............ | H04N 13/398 |
| | | | | 345/2.1 |
| 2016/0275641 A1* | 9/2016 | Bostick | ............ | H04N 5/265 |
| 2018/0157682 A1 | 6/2018 | Wakabayashi | | |

FOREIGN PATENT DOCUMENTS

| | | | |
|---|---|---|---|
| JP | 2009-187233 A | 8/2009 | |
| JP | 2009-232250 A | 10/2009 | |
| JP | 2009-284123 A | 12/2009 | |
| JP | 2017-4252 A | 1/2017 | |

\* cited by examiner

FIG. 4B

DETAILS OF REGISTRATION CONDITIONS SETTING (180b2)

| SETTING ITEM | DETAILED SETTING CONTENT | SETTING RANGE |
|---|---|---|
| SHARE IMAGE | SHARE WITH REGISTERED USER | e*****@eee.jp<br>f*****@fff.jp<br>g*****@ggg.jp<br>h*****@hhh.jp |
| | SHARE WITH ALL USERS | — |

FIG. 4C

DETAILS OF REPLAY CONDITIONS SETTING (180b3)

| SETTING ITEM | DETAILED SETTING CONTENT | SETTING RANGE |
|---|---|---|
| REPLAY ACCORDING TO DATE AND TIME | YEAR | ONLY SAME YEAR / X YEARS OR MORE BEFORE |
| | MONTH | ONLY SAME MONTH / X MONTHS BEFORE AND AFTER |
| | DAY | ONLY SAME DAY / X DAYS BEFORE AND AFTER |
| | TIME | X MINUTES BEFORE AND AFTER |
| REPLAY ACCORDING TO LOCATION | CURRENT LOCATION | WITHIN X m FROM CURRENT LOCATION |
| | DESIGNATED LOCATION | DESIGNATED LOCATION: LATITUDE/LONGITUDE<br>WITHIN X m FROM DESIGNATED LOCATION |
| REPLAY ACCORDING TO DIRECTION ANGLE | DIRECTION ANGLE | ANGLE DIFFERENCE: WITHIN ±X° |
| | DIRECTION OF TARGET | ANGLE DIFFERENCE: WITHIN ±X° |
| REPLAY FRIEND IMAGE | SPECIFIC USER | i*****@iii.jp<br>j*****@jjj.jp<br>k*****@kkk.jp<br>m*****@mmm.jp |
| | ALL USERS | — |

METHOD OF CALCULATING DIRECTION OF TARGET

CAMERA FUNCTION SCREEN

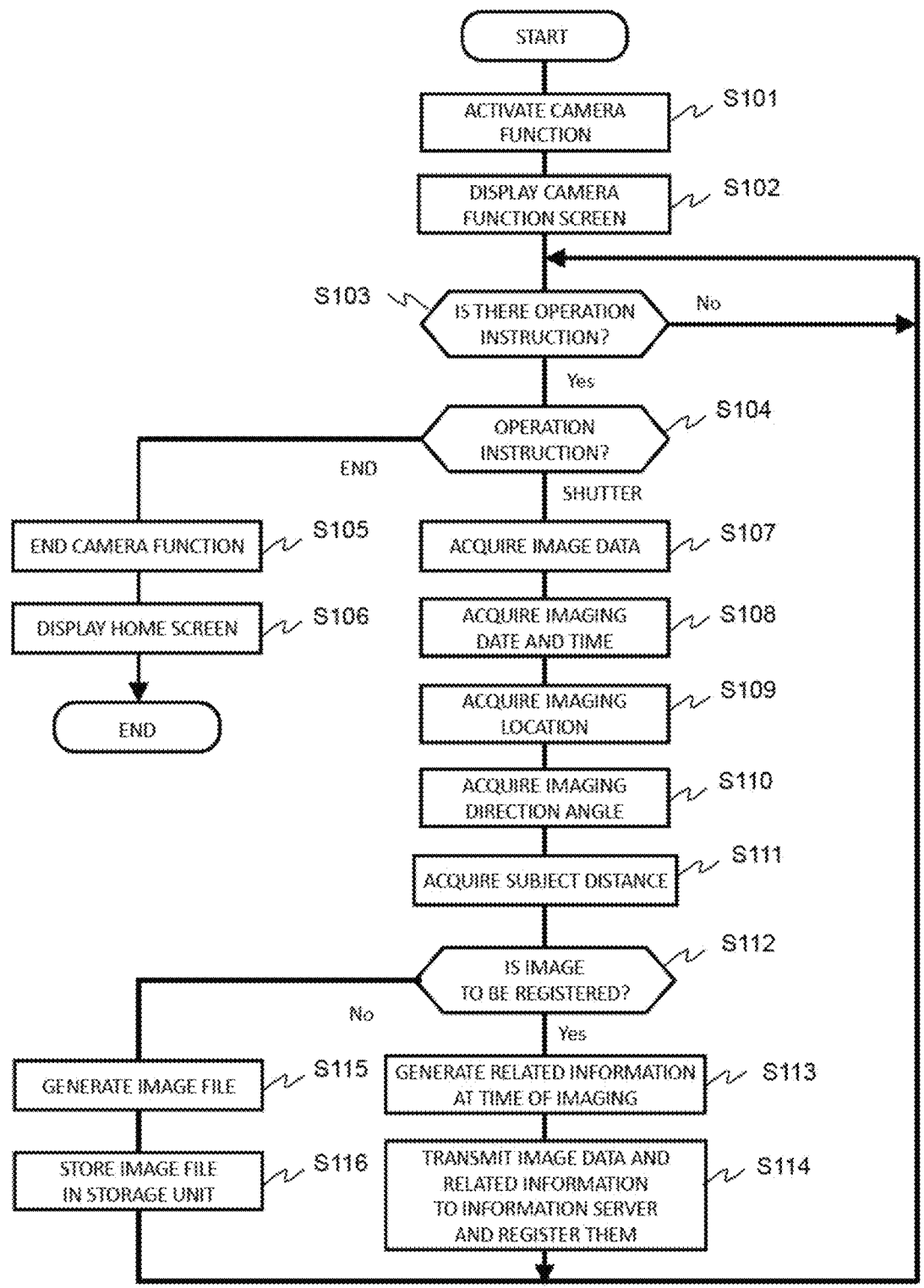

FIG. 6A
IMAGE DATABASE (3011)

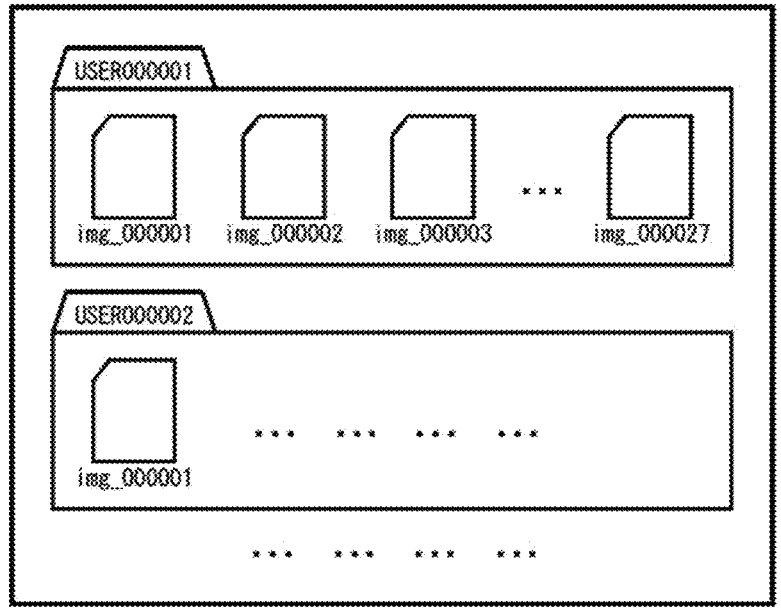

FIG. 6B
USER DATABASE (3012)

| LOGIN NAME | PASSWORD | NAME | E-MAIL ADDRESS | CONTACT NUMBER |
|---|---|---|---|---|
| USER000001 | A**999 | ○YAMA ○○ | a*@aaa.jp | 090-**-1111 |
| USER000002 | B**888 | ×KAWA ×E | b*@bbb.jp | 080-**-2222 |
| USER000003 | C**777 | △TA △RO | c*@ccc.jp | 070-**-3333 |
| USER000004 | D**666 | □MURA □KO | d*@ddd.jp | 060-**-4444 |
| ⋮ | ⋮ | ⋮ | ⋮ | ⋮ |

FIG. 6C
RELATED INFORMATION DATABASE (3012)

| IMAGE IDENTIFICATION | USER IDENTIFICATION | IMAGING DATE AND TIME (Y/M/D/H/M/S) | IMAGING LOCATION (LAT/LONG) | IMAGING DIRECTION ANGLE |
|---|---|---|---|---|
| img_000001 | USER000001 | 2015/04/18/13/36/41 | 35.4030/139.5310 | 15° |
| img_000002 | USER000001 | 2015/09/03/09/27/15 | 35.4034/139.5324 | 105° |
| img_000003 | USER000001 | 2016/10/11/17/11/31 | 35.4041/139.5327 | 195° |
| ⋮ | ⋮ | ⋮ | ⋮ | ⋮ |
| img_000027 | USER000001 | 2017/08/24/13/22/53 | 35.4031/139.5330 | 33° |
| img_000001 | USER000002 | 2011/02/01/04/58/20 | 35.2776/139.5097 | 244° |
| ⋮ | ⋮ | ⋮ | ⋮ | ⋮ |

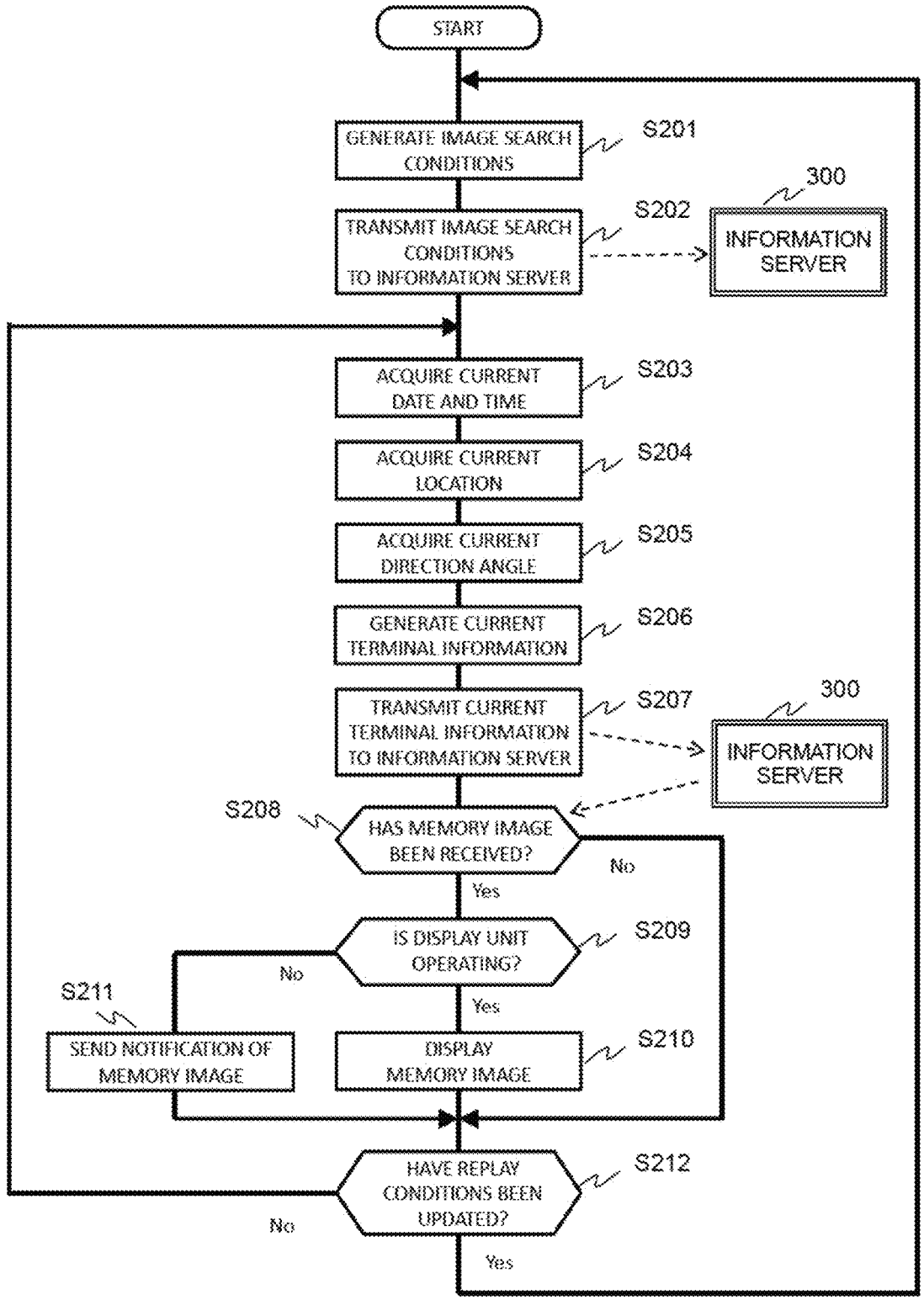

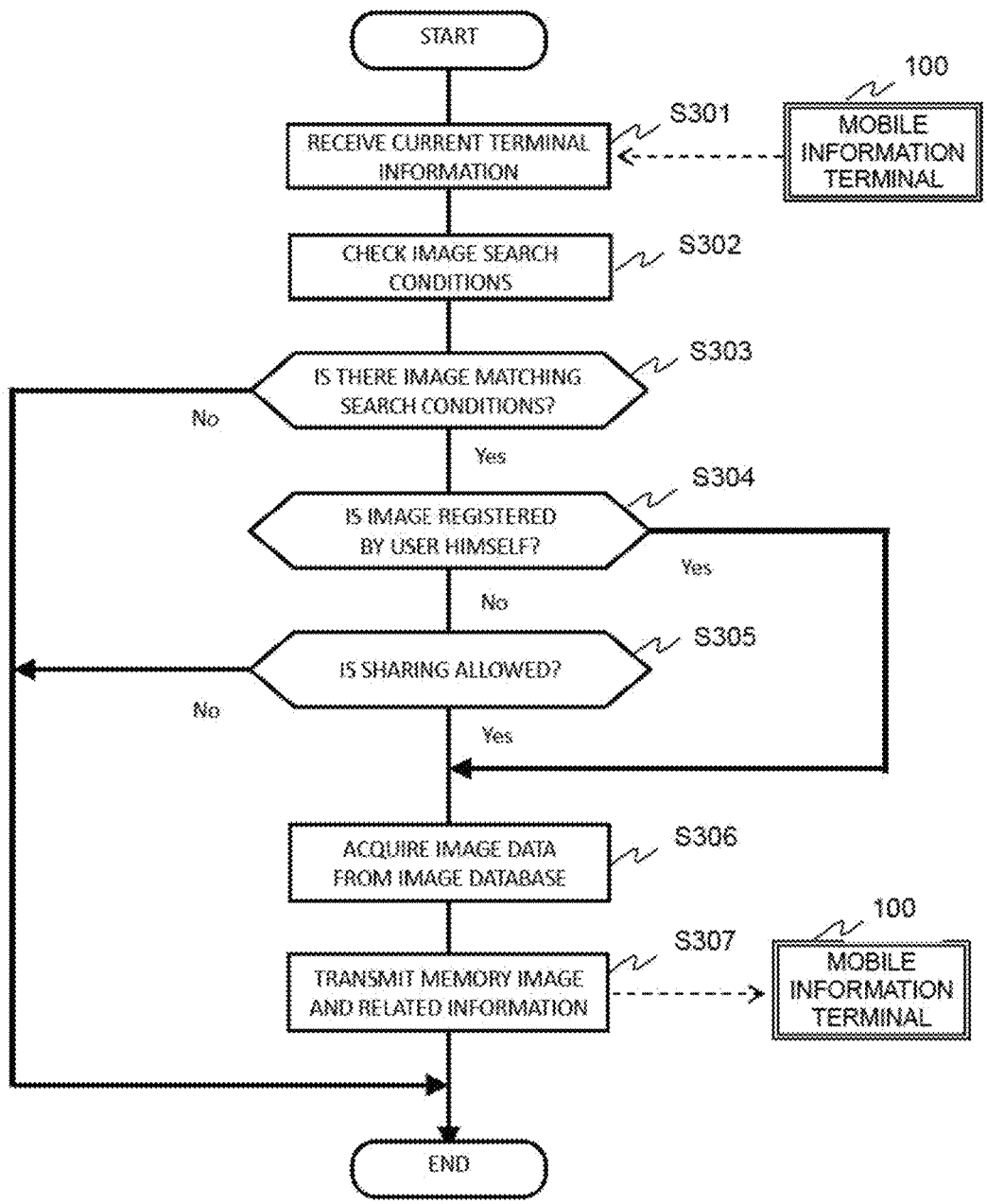

DISPLAY EXAMPLE 1

DISPLAY EXAMPLE 2

DISPLAY EXAMPLE 3

FIG. 9A
WHEN USING VIEWING DEVICE
(a)
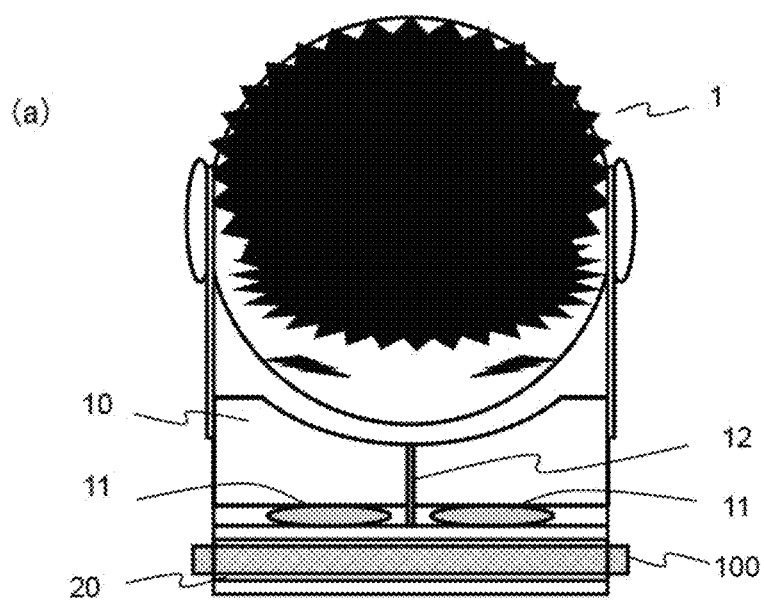
(b)
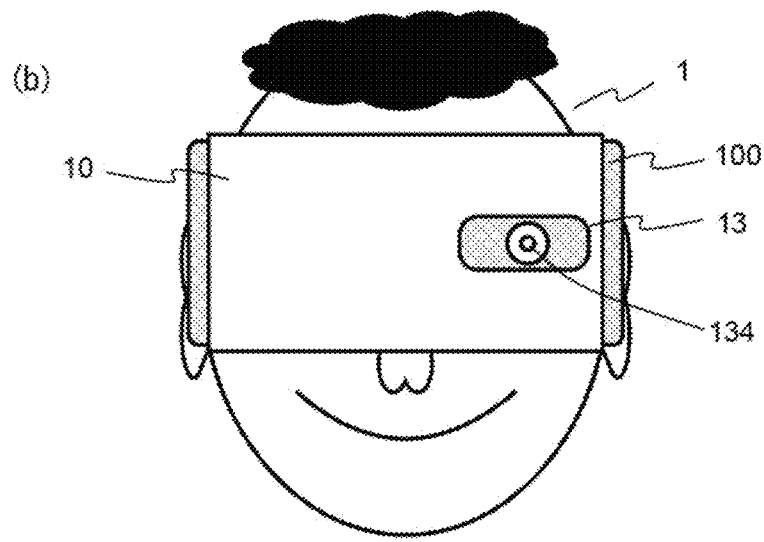

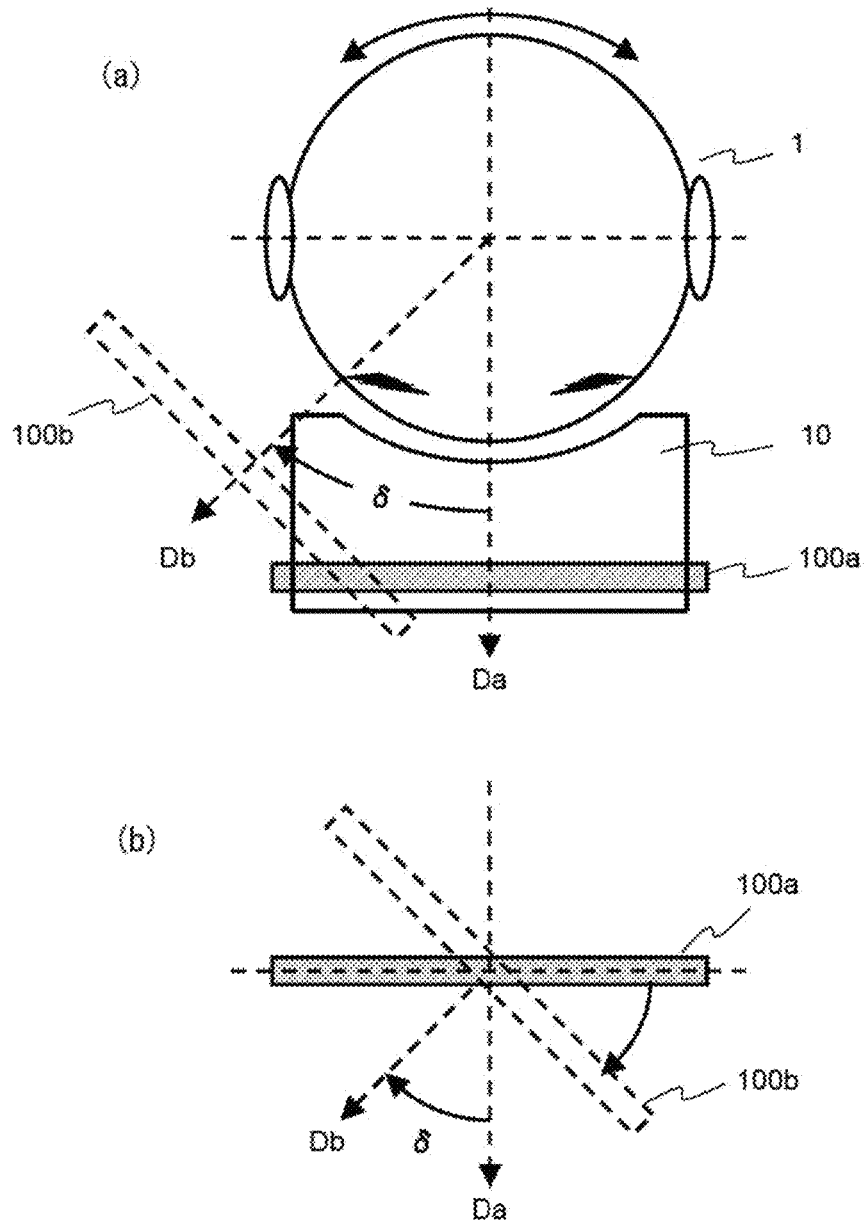

MOBILE INFORMATION TERMINAL, INFORMATION PRESENTATION SYSTEM AND INFORMATION PRESENTATION METHOD

CROSS-REFERENCE OF RELATED APPLICATIONS

The present application is the U.S. National Phase under 35 U.S.C. § 371 of International Application No. PCT/JP2018/005531, filed on Feb. 16, 2018, the entire contents of which are incorporated herein by reference.

TECHNICAL FIELD

The present invention relates to a mobile information terminal, an information presentation system, and an information presentation method for capturing an image, storing the image in an information server, acquiring the image from the information server, and displaying the image.

BACKGROUND ART

Mobile information terminals, such as smartphones and tablet terminals, have become widespread. The mobile information terminal has a camera function, and the user can capture various images using the camera function and store the captured images in a storage unit of the mobile information terminal, a cloud storage, or the like. In addition, the user can replay and display the images stored in the storage unit, the cloud storage, or the like using the mobile information terminal, so that the user can recall the situation or impression at the time when the images were captured.

For example, Patent Document 1 discloses an information presentation method based on a configuration in which "when a current location is measured or indicated on a user terminal and transmitted to a server, the server transmits, to the user terminal, image information of a photograph taken at a location within a predetermined distance from the current location, information indicating the imaging location, and biological information of a photographer at the time of imaging. In the user terminal, the transmitted information is displayed by spatial expression or presented by vibration or blinking of light", so that "the user can experience a situation or condition of another person at a place and feel a loose connection with the person while actually going to the place or staying at home or the user can re-experience the past his or her situation or condition at the location and recall the memories".

CITATION LIST

Patent Document

Patent Document 1: JP 2009-187233 A

SUMMARY OF THE INVENTION

Problems to be Solved by the Invention

The technique described in Patent Document 1 is to select an image based on a current location (or a set location), an imaging location, and a distance therebetween and present the selected image together with biological information according to a user's operation instruction. At this time, location information of the current location and the imaging location is used as the image selection conditions. However, it is thought that it is difficult to effectively provide an image causing the user to recall the memories only with the conditions.

That is, in order for the user to effectively recall the memories at the time of imaging, it is necessary to select an image in consideration of various conditions, such as the season (month and day) or time when the image was captured in the past and a direction angle at which a camera was directed to an imaging target (subject). For example, if images captured on a certain day in winter are presented in the same season (or the same month and day), it is easy to recall the memories of that time. In addition, if images captured in the evening of a certain day are presented in a similar time zone (evening), it is easy to recall the memories of that time. In addition, even after an imaging target (subject) captured in the past has disappeared, if the image is presented when facing the direction angle at which there was the imaging target (subject) from the imaging location at that time, it is easy to recall the memories of that time. In addition, since such selection conditions (season, month and day, time, direction angle, and the like) change according to each user and the user's situation, it is desirable that the user can appropriately set the selection conditions.

In addition, when presenting the selected memory image to the user, it is necessary to study a display method. In the above Patent Document 1, an image captured in the past is displayed so as to be linked to a map, and biological information acquired from the user at the time of imaging is also presented. However, in a situation where the user is currently performing imaging using a mobile terminal, how to display a memory image for a camera image being captured has not been taken into consideration. That is, when a plurality of images are selected, it is desirable to highlight and display images that may be of particular interest to the user, instead of displaying the images uniformly.

It is an object of the present invention to provide a mobile information terminal, an information presentation system, and an information presentation method for selecting an image captured and stored by a user in the past under conditions set by the user and effectively displaying the image for the user.

Solutions to Problems

A mobile information terminal of the present invention includes: an image input unit to which captured image data is input; an information acquisition unit that acquires various kinds of information, which include date and time information, location information, direction angle information, and information of a distance to a subject, as a status of the mobile information terminal; a communication unit that transmits and receives image data and various kinds of information to and from an information server through a network; a display unit that displays an input image based on the image data input to the image input unit and/or a related image based on the image data received by the communication unit; and a control unit that controls an operation of each unit of the mobile information terminal. The control unit performs control such that various kinds of information indicating a status of the mobile information terminal at the time of imaging acquired by the information acquisition unit are transmitted together with related information at the time of imaging including user identification information, by which a user of the mobile information terminal is identifiable, when storing the captured image data in the information server; various kinds of information indicating a current status of the mobile information terminal acquired by the information acquisition unit, current terminal information including the user identification information by which the user of the mobile information terminal is identifiable, and image search conditions describing replay conditions set by the user of the mobile information terminal are transmitted to the information server when making a request for the image data stored in the information server; and image data searched for based on the current terminal information and the image search conditions in the information server is acquired and displayed on the display unit as a related image.

In an information presentation system of the present invention, a mobile information terminal includes: an image input unit to which captured image data is input; an information acquisition unit that acquires various kinds of information, which include date and time information, location information, direction angle information, and information of a distance to a subject, as a status of the mobile information terminal; a communication unit that transmits and receives image data and various kinds of information to and from an information server through a network; and a display unit that displays an input image based on the image data input to the image input unit and/or a related image based on the image data received by the communication unit. The information server includes: a storage unit that stores image data and various kinds of information transmitted from the mobile information terminal; an image search unit that searches for corresponding image data from the storage unit in response to a request from the mobile information terminal; and a communication unit that transmits and receives image data and various kinds of information to and from the mobile information terminal through the network.

The mobile information terminal transmits various kinds of information indicating a status of the mobile information terminal at the time of imaging acquired by the information acquisition unit together with related information at the time of imaging including user identification information, by which a user of the mobile information terminal is identifiable, when storing the captured image data in the information server, and transmits to the information server various kinds of information indicating a current status of the mobile information terminal acquired by the information acquisition unit, current terminal information including the user identification information by which the user of the mobile information terminal is identifiable, and image search conditions describing image data replay conditions set by the user of the mobile information terminal when making a request for the image data stored in the information server. The information server searches for corresponding image data from the storage unit based on the current terminal information and the image search conditions received from the mobile information terminal, and transmits the searched image data to the mobile information terminal.

An information presentation method of the present invention includes: a step in which, when storing captured image data in an information server, a mobile information terminal transmits various kinds of information, which include date and time information, location information, direction angle information, and information of a distance to a subject indicating a status of the mobile information terminal at the time of imaging, and related information at the time of imaging, which includes user identification information by which a user of the mobile information terminal is identifiable, to the information server together with the captured image data; and a step in which the information server stores the image data and the related information at the time of imaging, which have been transmitted from the mobile information terminal, in a storage unit. In addition, the information presentation method includes: a step in which, when making a request for the image data stored in the information server, the mobile information terminal transmits to the information server various kinds of information indicating a current status of the mobile information terminal, current terminal information including the user identification information by which the user of the mobile information terminal is identifiable, and image search conditions describing image data replay conditions set by the user of the mobile information terminal; a step in which the information server searches for corresponding image data from the storage unit based on the current terminal information and the image search conditions received from the mobile information terminal and transmits the searched image data to the mobile information terminal; and a step in which the mobile information terminal displays the image data transmitted from the information server on a display unit as a related image.

Effects of the Invention

According to the present invention, since images captured and stored in the past by a user are selected under the conditions set by the user and a closely related image is highlighted, the user can effectively recall the memories, such as a situation or impression at the time of imaging.

BRIEF DESCRIPTION OF THE DRAWINGS

FIG. 4B is a diagram describing the details of registration conditions setting.

FIG. 4C is a diagram describing the details of replay conditions setting.

FIG. 5B is a flowchart of a memory image registration process.

FIG. 6A is a configuration diagram of an image database in an information server.

FIG. 6B is a configuration diagram of a user database in the information server.

FIG. 6C is a configuration diagram of a related information database in the information server.

FIG. 7A is a flowchart of a memory image replay process (on the mobile information terminal side).

FIG. 7B is a flowchart of a memory image search process (on the information server side).

FIG. 9A is a diagram illustrating the use condition of a viewing device in which a mobile information terminal is inserted.

FIG. 9B is an explanatory diagram of a change in the user's line of sight and the orientation of the mobile information terminal.

MODE FOR CARRYING OUT THE INVENTION

Hereinafter, an embodiment of the present invention will be described with reference to the diagrams. In the embodiment described below, the term "memory image" is used, but this is an image capable of reproducing the situation or impression at the time of imaging so that the user who captured the image can recall the memories. Specifically, since various conditions (date and time, location, and the like) at the time of imaging are often related to the current situation (date and time, location, and the like), the memory image can be generally referred to as a "related image".

The mobile information terminal used in the present embodiment may be a mobile phone, a smartphone, a tablet terminal, and the like. Alternatively, a head mounted information terminal, such as a head mounted display (HMD), may be used. In addition, the head mounted information terminal may be substituted by fixing a smartphone, a tablet terminal, or the like to an adapter. In addition, a PDA (personal digital assistants), a notebook PC (personal computer), an electronic book reader, and the like may be used. In addition, other digital devices such as a digital still camera, a video camera capable of capturing a moving image, and a mobile game machine may be used. In the following embodiment, a case where a smartphone is mainly used as a mobile information terminal will be described.

[Configuration of Information Presentation System]

Figure 1:
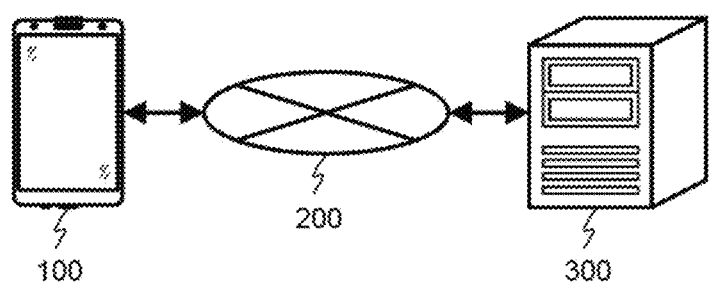
FIG. 1 is a configuration diagram of an information presentation system.

FIG. 1 is a system configuration diagram illustrating an example of an information presentation system according to the present embodiment. The information presentation system includes a mobile information terminal 100, a broadband network 200 such as the Internet, and an information server 300.

The mobile information terminal 100 can be connected to a network (Internet) 200 through an access point (not illustrated) or a base station of a mobile phone communication network (not illustrated), and can transmit and receive data to and from each server device on the network 200. The connection between the mobile information terminal 100 and the access point is performed by a wireless communication method, such as Wi-Fi (registered trademark), or other communication methods. The connection between the mobile information terminal 100 and the base station of the mobile phone communication network is performed by a W-CDMA (wideband code division multiple access) (registered trademark) method, a GSM (global system for mobile communications) (registered trademark) method, an LTE (long term evolution) method, or other communication methods.

The information server 300 is a server device installed by a company that provides an information storage/presentation service. The information server 300 receives and stores image data and related information transmitted from the mobile information terminal 100, and transmits image data and related information searched for in response to the request from the mobile information terminal 100 to the mobile information terminal 100.

In addition, in FIG. 1, only one mobile information terminal 100 and one information server 300 that are connected to the network 200 are illustrated. However, a plurality of mobile information terminals 100 and a plurality of information servers 300 can be appropriately connected to each other to perform data transmission and reception therebetween.

[Appearance of Mobile Information Terminal]

Figure 2A:
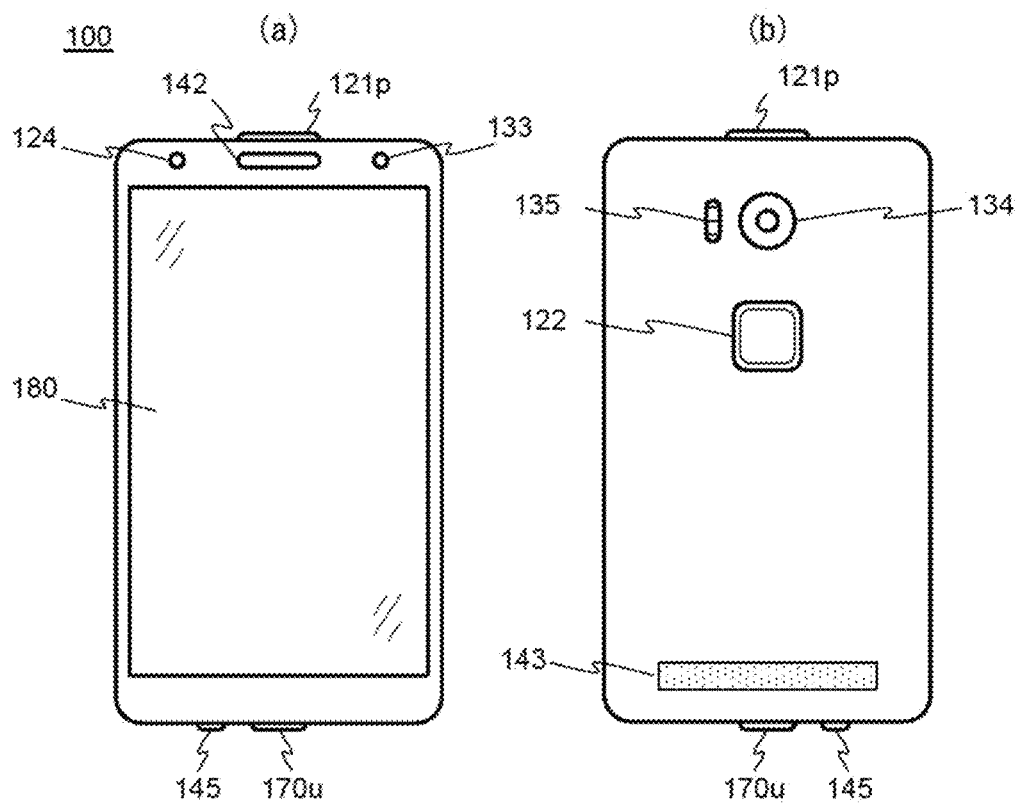
FIG. 2A is an external view of a mobile information terminal.

FIG. 2A is an external view illustrating an example of the mobile information terminal 100. Here, a front (top) view (a) and a back (rear) view (b) when the mobile information terminal 100 is a smartphone are illustrated.

In (a), an operation indicator 124, a first image input unit 133, a monaural speaker 142, and a touch screen 180 are provided on the front of the mobile information terminal 100. The operation indicator 124 displays the operation state of the mobile information terminal 100 based on the presence or absence of lighting/blinking of an LED (light emitting diode). The touch screen 180 includes a touch panel 123 and a display unit 131.

In (b), a touch sensor 122, a second image input unit 134, an auxiliary light emitting/infrared distance measuring device 135, and a stereo speaker 143 are provided on the back of the mobile information terminal 100. The auxiliary light emitting/infrared distance measuring device 135 emits auxiliary light for compensating for insufficient light quantity when an image is input from the second image input unit 134. The auxiliary light emitting/infrared distance measuring device 135 measures a distance to the subject using infrared light.

Here, of the two image input units, the first image input unit 133 disposed on the front is referred to as "in-camera", and the second image input unit 134 disposed on the back is referred to as "out-camera". The touch sensor 122 may be disposed not on the back of the mobile information terminal 100 but on the side, the lower part of the front (a part not overlapping the touch screen 180), or the like. In addition, the touch panel 123 included in the touch screen 180 may also have the function of the touch sensor 122. In this case, the function (for example, a fingerprint authentication function) of the touch sensor 122 can be executed at an arbitrary location on the touch screen 180.

At the upper end of the mobile information terminal 100, a power key 121p, which is one of operation keys 121, is provided. At the lower end of the mobile information terminal 100, an audio input unit 145 and a p-USB input unit 170u, which is one of extended interface units 170, are provided.

[Home Screen of Mobile Information Terminal]

Figure 2B:
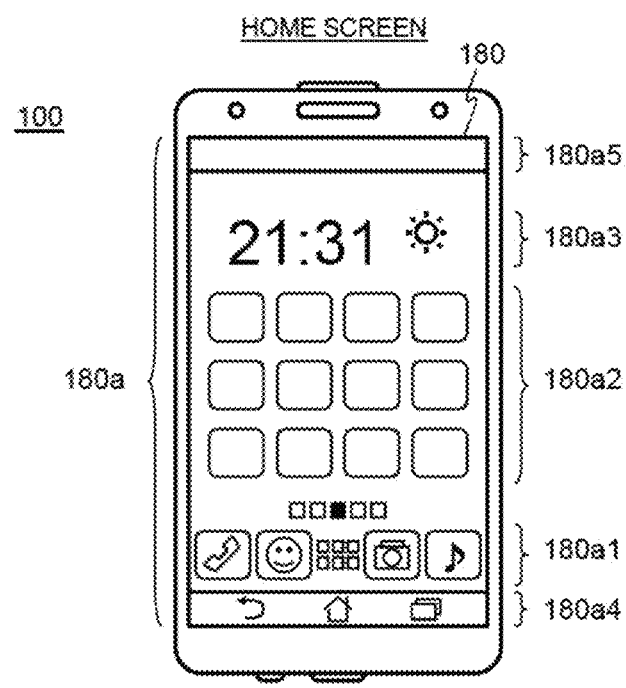
FIG. 2B is a diagram illustrating a home screen of the mobile information terminal.

FIG. 2B is a diagram illustrating an example of a home screen displayed on the mobile information terminal 100. A home screen 180a displayed on the touch screen 180 includes a main function icon display area 180a1, a general icon display area 180a2, an other information display area 180a3, a control key area 180a4, and a notification area 180a5. The home screen 180a is a basic screen displayed after the mobile information terminal 100 is powered on, after the sleep mode is released, or while an arbitrary application is being executed.

The main function icon display area 180a1 is a display area for icons associated with main applications frequently used in the mobile information terminal 100. The general icon display area 180a2 is a display area for icons associated with other applications. The other information display area 180a3 is an area for displaying general information, such as time information or weather information. The control key area 180a4 is an area for displaying a "back key", a "home key", and an "application history key". The notification area 180a5 is an area where notification of information, such as a radio wave state or a remaining battery level, is given.

[Hardware Configuration of Mobile Information Terminal]

Figure 2C:
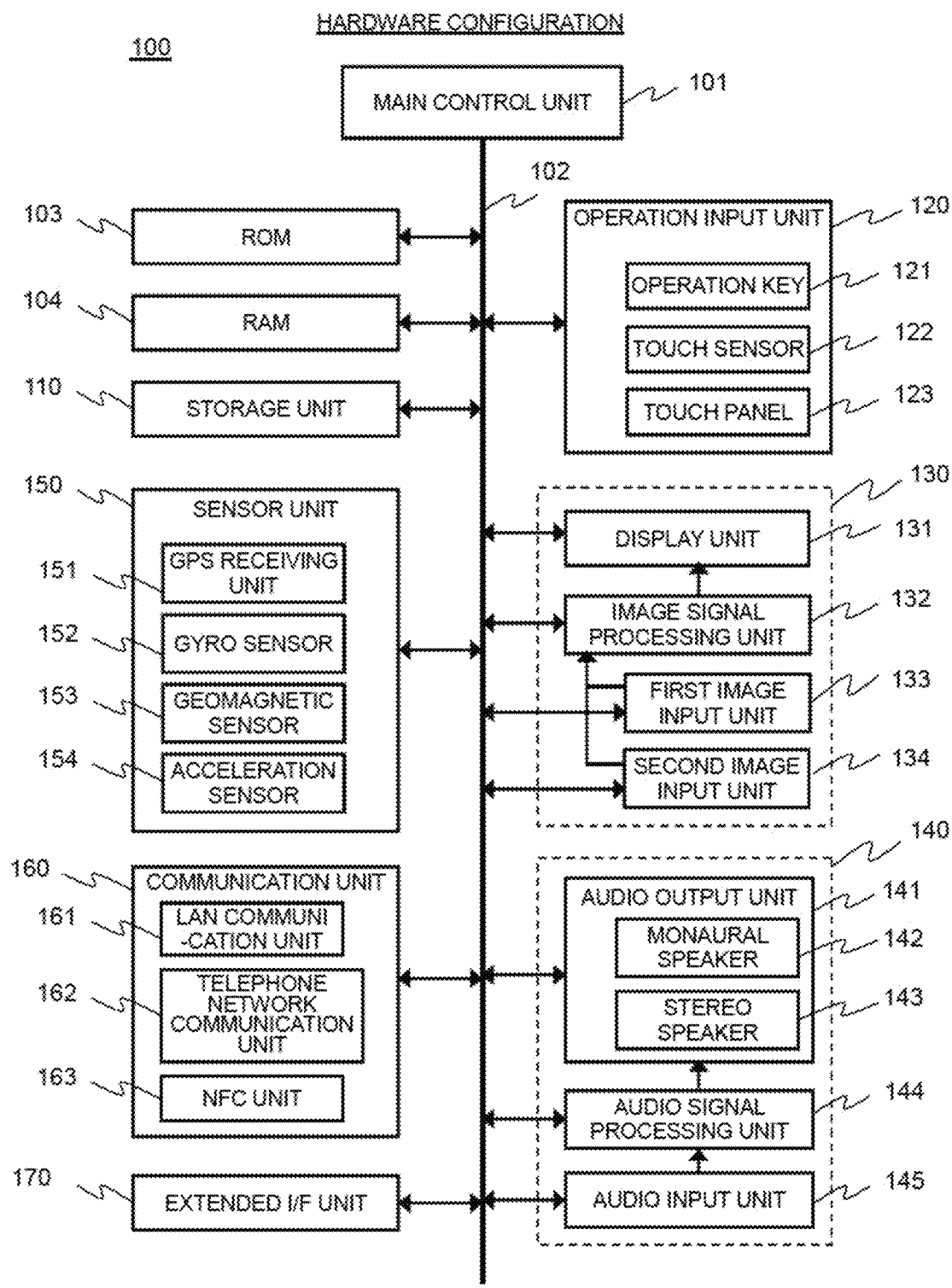
FIG. 2C is a hardware configuration diagram of the mobile information terminal.

FIG. 2C is a diagram illustrating an example of the hardware configuration of the mobile information terminal 100. The mobile information terminal 100 is configured to include a main control unit 101, a system bus 102, a ROM 103, a RAM 104, a storage unit 110, an operation input unit 120, an image processing unit 130, an audio processing unit 140, a sensor unit 150, a communication unit 160, and an extended interface unit 170.

The main control unit 101 is a microprocessor unit that performs overall control of the mobile information terminal 100 according to a predetermined operation program. The system bus 102 is a data communication path for transmitting and receiving various commands or data between the main control unit 101 and each operation block in the mobile information terminal 100.

A ROM (read only memory) 103 is a memory in which a basic operation program, such as an operating system, or other operation programs (applications; the same hereinbelow) are stored. For example, a rewritable ROM, such as an EEPROM (electrically erasable programmable ROM) or a flash ROM, is used. A RAM (random access memory) 104 is a work area when a basic operation program or other operation programs are executed. The ROM 103 and the RAM 104 may be integrated with the main control unit 101. In addition, the ROM 103 may not be an independent component illustrated in FIG. 2C, and a partial storage area in the storage unit 110 may be used.

The storage unit 110 stores operation programs or operation set values of the mobile information terminal 100, personal information or authentication information of an authorized user of the mobile information terminal 100, and the like. In addition, an operation program downloaded from a network, various kinds of data created by the operation program, and the like can be stored. In addition, contents such as moving images, still images, or sounds downloaded from the network can be stored. In addition, data such as a moving image or a still image captured using the camera function can be stored. All or some of the functions of the ROM 103 may be replaced with a partial area of the storage unit 110. In addition, the storage unit 110 needs to hold information stored even when no power is supplied from the outside to the mobile information terminal 100. Therefore, for example, devices, such as a semiconductor device memory such as a flash ROM or an SSD (solid state drive) and a magnetic disk drive such as an HDD (hard disc drive), are used. In addition, each operation program stored in the ROM 103 or the storage unit 110 can be updated and its function can be extended by processing of downloading from each server device on the network.

The operation input unit 120 is an instruction input unit for inputting an operation instruction to the mobile information terminal 100. The operation input unit 120 includes the operation keys 121 in which button switches and the like are disposed, the touch sensor 122 for detecting that there has been a touch of the finger of the operator (user) based on a change in electrostatic capacitance, and the touch panel 123 disposed so as to overlap the display unit 131. In addition, as other operation devices, a keyboard connected to the extended interface unit 170, a separate mobile terminal device connected by wire communication or wireless communication, and the like may be used. Alternatively, the mobile information terminal 100 may be operated by audio input. The touch sensor 122 has a function of detecting a fingerprint or palm print of a finger touching the sensor unit.

The image processing unit 130 includes the display unit 131, an image signal processing unit 132, the first image input unit 133, and the second image input unit 134. The display unit 131 is a display device, such as a liquid crystal panel, for example, and displays image data processed by the image signal processing unit 132 and provides the image data to the user of the mobile information terminal 100. The image signal processing unit 132 includes a video RAM (not illustrated), and drives the display unit 131 based on the input image data. In addition, the image signal processing unit 132 performs encoded video signal decoding processing, format conversion processing, superimposition processing on a menu or other OSD (on screen display) signals, and the like, as necessary. The first image input unit 133 and the second image input unit 134 are imaging units, such as an in-camera and an out-camera, and convert light input from a lens into an electric signal using an electronic device, such as a CCD (charge coupled device) or CMOS (complementary metal oxide semiconductor) sensor, to acquire image data of the subject.

The audio processing unit 140 includes an audio output unit 141, an audio signal processing unit 144, and an audio input unit 145. The audio output unit 141 is a speaker, and provides the audio signal processed by the audio signal processing unit 144 to the user of the mobile information terminal 100. The monaural speaker 142 outputs monaural sound during a voice call or the like, and the stereo speaker 143 outputs stereo sound during music playback or the like. The audio signal processing unit 144 performs encoded audio signal decoding processing as necessary. The audio input unit 145 is a microphone, and converts the user's voice or the like into audio data to receive the data.

The sensor unit 150 is a group of various sensors for detecting the state of the mobile information terminal 100. The sensor unit 150 has a GPS (global positioning system) receiving unit 151, a gyro sensor 152, a geomagnetic sensor 153, and an acceleration sensor 154 as sensors, and detects the location, tilt, direction angle, and movement of the mobile information terminal 100. In addition, an illuminance sensor, a proximity sensor, a barometric pressure sensor, and the like may be provided to detect the surrounding brightness, the proximity of surrounding objects, and the like.

The communication unit 160 includes a LAN (local area network) communication unit 161, a telephone network communication unit 162, and an NFC (near field communication) unit 163. The LAN communication unit 161 is connected to the network 200, such as the Internet, through an access point or the like, and transmits and receives data to and from the information server 300 on the network. Connection with an access point or the like is performed by wireless connection, such as Wi-Fi (registered trademark). The telephone network communication unit 162 performs telephone communication (call) and data transmission and reception by wireless communication with a base station of a mobile phone communication network. Communication with a base station or the like may be performed by the W-CDMA (registered trademark) method, the LTE method, or the like. The NFC unit 163 performs wireless communication when approaching a corresponding reader/writer. Each of the LAN communication unit 161, the telephone network communication unit 162, and the NFC unit 163 includes an encoding circuit, a decoding circuit, an antenna, and the like. The communication unit 160 may further include a Bluetooth (registered trademark) communication unit, an infrared communication unit, and the like.

The extended interface unit 170 is a group of interfaces for extending the function of the mobile information terminal 100, and includes a video/audio interface, a USB (universal serial bus) interface, a memory interface, and the like. The video/audio interface performs input/output of a video signal/audio signal with an external video/audio device. The USB interface connects to a PC, a keyboard, and other USB devices to transmit and receive data. The memory interface connects to a memory card or other memory media to transmit and receive data.

In addition, in the configuration example of the mobile information terminal 100 illustrated in FIG. 2C, many components that are not essential for the operation of the present embodiment are provided, and the effect of the present embodiment is not affected even in the case of a configuration in which these are not provided.

[Software Configuration of Mobile Information Terminal]

Figure 2D:
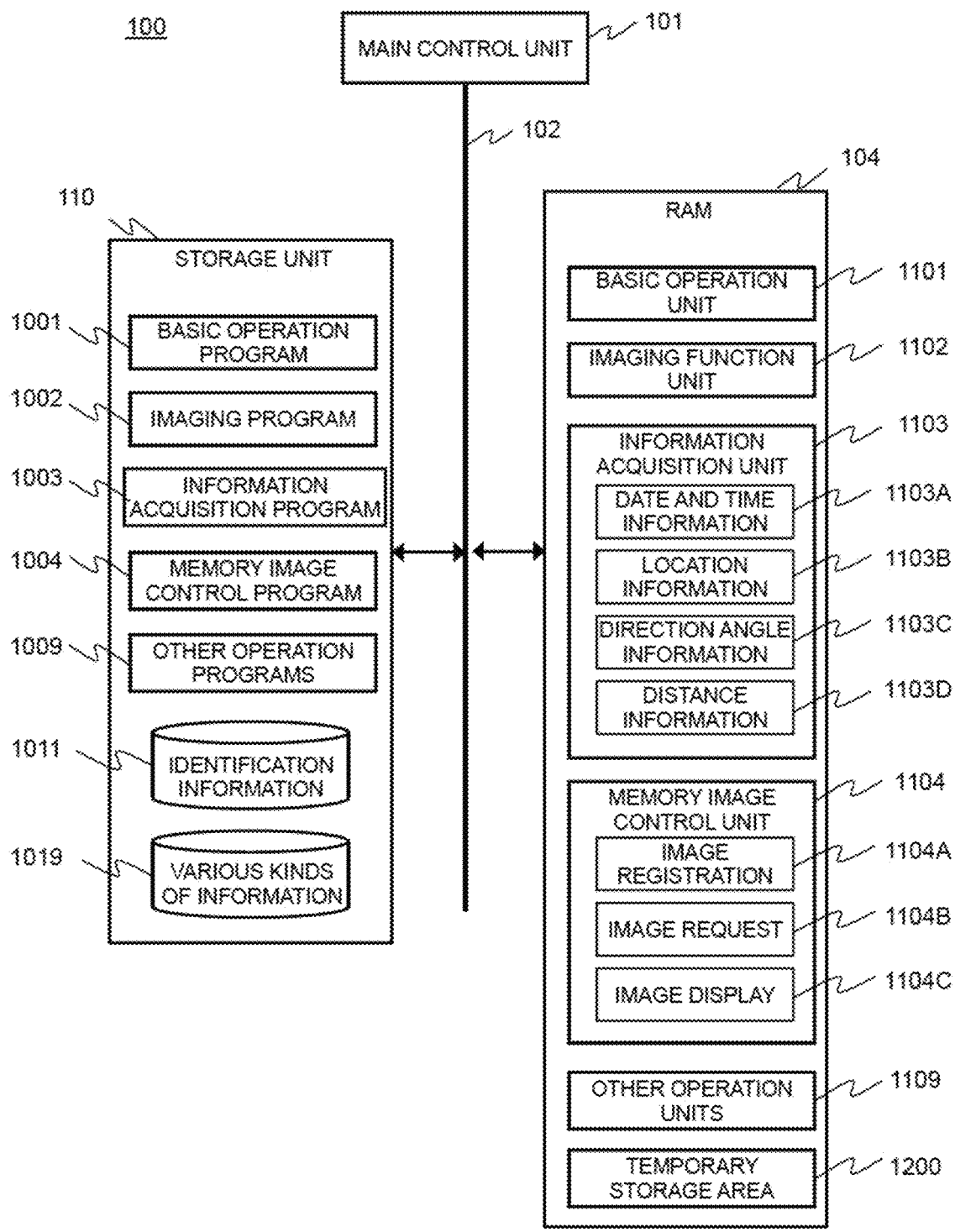
FIG. 2D is a software configuration diagram of the mobile information terminal.

FIG. 2D is a diagram illustrating an example of the software configuration of the mobile information terminal 100. Here, the configuration of software in the storage unit 110 (or the ROM 103; the same hereinbelow) and the RAM 104 is illustrated. The storage unit 110 stores a basic operation program 1001, an imaging program 1002, an information acquisition program 1003, a memory image control program 1004, and other operation programs 1009. In addition, the storage unit 110 includes an identification information storage area 1011 for storing user identification information by which the mobile information terminal 100 or its user can be identified and a various information storage area 1019 for storing other pieces of information.

The basic operation program 1001 stored in the storage unit 110 is loaded to the RAM 104, and the main control unit 101 executes the loaded basic operation program to configure a basic operation unit 1101. Similarly, the imaging program 1002, the information acquisition program 1003, the memory image control program 1004, and the other operation programs 1009 are loaded to the RAM 104, and the main control unit 101 executes the loaded operation programs to configure an imaging function unit 1102, an information acquisition unit 1103, a memory image control unit 1104, and other operation units 1109. In addition, the RAM 104 includes a temporary storage area 1200 for temporarily storing data created when each operation program is executed.

Hereinafter, in order to simplify the description of the operation, a process in which the main control unit 101 loads the basic operation program 1001 stored in the storage unit 110 to the RAM 104 and executes the program to control each operation block will be described as "the operation unit 1101 controls each operation block". The same description is given for the operations of other functional blocks by other operation programs.

The imaging function unit 1102 controls an image capturing process using a camera unit, such as the first image input unit 133 or the second image input unit 134. Since general operations/processes in the image capturing process are known, detailed description thereof will be omitted.

The information acquisition unit 1103 includes a date and time information acquisition unit 1103A, a location information acquisition unit 1103B, a direction angle information acquisition unit 1103C, and a distance information acquisition unit 1103D. The date and time information acquisition unit 1103A acquires date and time information from an internal clock (not illustrated) or a standard time server connected to a network. The location information acquisition unit 1103B acquires the location information of the mobile information terminal 100 based on the signal received by the GPS receiving unit 151. Alternatively, a beacon signal can be received by a Bluetooth (registered trademark) communication unit. The direction angle information acquisition unit 1103C acquires information of a direction angle at which the mobile information terminal 100 is directed, based on the geomagnetic information detected by the geomagnetic sensor 153. The distance information acquisition unit 1103D acquires information of the distance between the mobile information terminal 100 and the imaging target (subject) using a known technique, such as distance measurement using the auxiliary light emitting/infrared distance measuring device 135.

The memory image control unit 1104 includes an image registration unit 1104A, an image request unit 1104B, and an image display unit 1104C. The image registration unit 1104A performs control to register and store an image captured by the user in the information server 300. The image request unit 1104B performs control to acquire the registered and stored image from the information server 300 in response to a request from the user. The image display unit 1104C performs control to display the image acquired from the information server 300 on the display unit 131.

In addition, each of the operation programs is stored in the storage unit 110 in advance at the time of product shipment. Alternatively, after product shipment, each of the operation programs may be acquired from each server device on the network through the LAN communication unit 161 or the telephone network communication unit 162. In addition, each of the operation programs stored in a memory card, an optical disk, and the like may be acquired through the extended interface unit 170 or the like.

[Hardware Configuration of Information Server]

Figure 3:
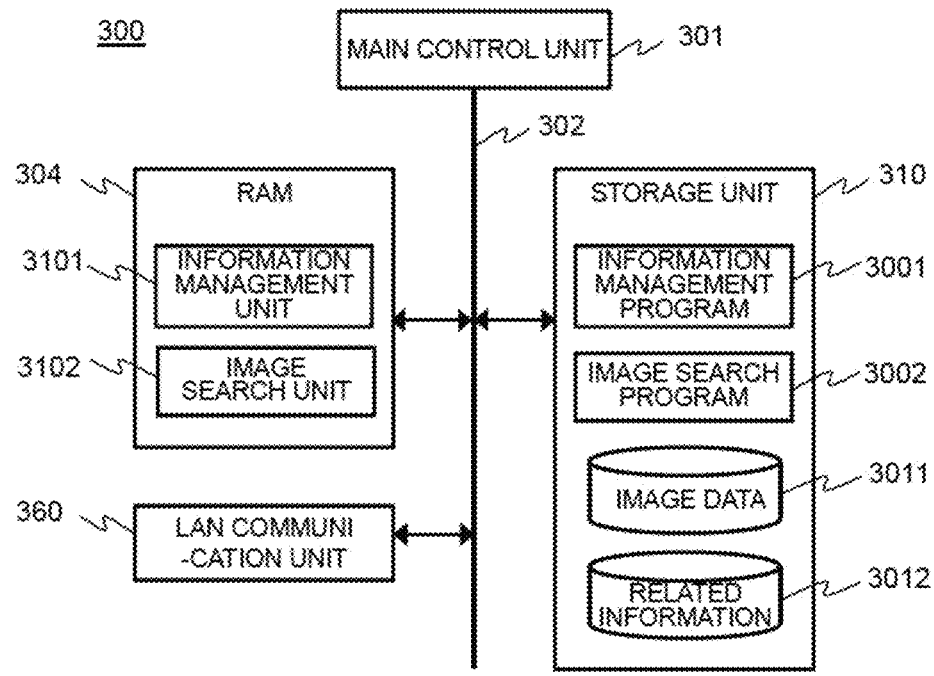
FIG. 3 is a hardware configuration diagram of an information server.

FIG. 3 is a diagram illustrating an example of the hardware configuration (including a partial software configuration) of the information server 300. The information server 300 includes a main control unit 301, a system bus 302, a RAM 304, a storage unit 310, and a LAN communication unit 360.

The main control unit 301 is a microprocessor unit that performs overall control of the information server 300 according to a predetermined operation program. The system bus 302 is a data communication path for transmitting and receiving various commands or data between the main control unit 301 and each operation block in the information server 300. The RAM 304 is a work area when each operation program is executed. The RAM 304 may be integrated with the main control unit 301.

The storage unit 310 stores an information management program 3001 and an image search program 3002. The storage unit 310 includes an image data storage area 3011 and a related information storage area 3012. The information management program 3001 and the image search program 3002 stored in the storage unit 310 are loaded to the RAM 304, and the main control unit 301 executes the loaded information management program 3001 and image search program 3002 to configure an information management unit 3101 and an image search unit 3102. In addition, the RAM 304 includes a temporary storage area (not illustrated) for temporarily storing data created when each operation program is executed, as necessary. Here, the information management unit 3101 stores the memory image and the related information transmitted from the mobile information terminal 100 in the image data storage area 3011 and the related information storage area 3012, respectively. The image search unit 3102 searches for a corresponding memory image in response to a request from the mobile information terminal 100.

The LAN communication unit 360 is connected to the network 200, such as the Internet, through a router device (not illustrated) or the like, and transmits and receives data to and from the mobile information terminal 100 on the network. The connection to the Internet or the like through the router device may be a wired connection or a wireless connection. The LAN communication unit 360 includes an encoding circuit, a decoding circuit, and the like.

[Memory Image Control Process]

Hereinafter, a memory image control process will be described in which image data captured using the mobile information terminal 100 is stored in the information server 300 as a memory image and the memory image stored in the information server 300 is searched for and provided to the mobile information terminal 100 so as to be replayed and displayed. In addition, hereinafter, the "memory image control process" and the like may be simply referred to as "memory control process" and the like.

[Memory Control Setting Process]

Figure 4A:
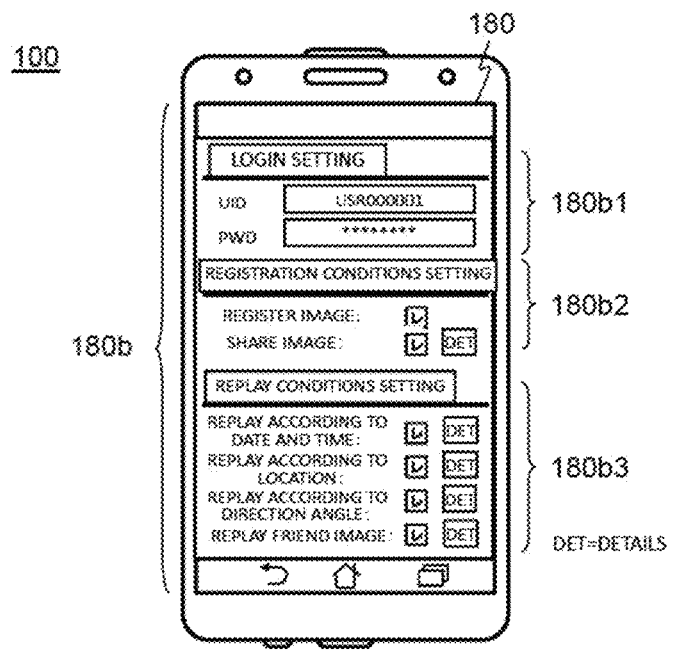
FIG. 4A is a diagram illustrating a memory control setting screen of the mobile information terminal.

FIG. 4A is a diagram illustrating an example of a control setting screen (memory control setting screen) for a memory image in the mobile information terminal 100. A memory control setting screen 180*b* is displayed by activating a memory control application. An instruction to activate the memory control application is given by tapping the icon of the memory control application displayed in the main function icon or general icon display areas 180*a1* and 180*a2* on the home screen 180*a* of FIG. 2B. The basic operation unit 1101 delegates a control subject to the memory image control unit 1104 according to the user's instruction, and the memory image control unit 1104 displays the memory control setting screen 180*b* for setting the memory image control conditions on the touch screen 180 (display unit 131).

The memory control setting screen 180*b* includes a login setting area 180*b1*, a registration conditions setting area 180*b2*, and a replay conditions setting area 180*b3*. The login setting area 180*b1* is an area for inputting login name information for logging in to the information server 300 and password information for user authentication. When the memory control application is activated, the mobile information terminal 100 logs in to the information server 300 using the information input in the login setting area 180*b1*.

The registration conditions setting area 180*b2* is an area for setting whether to register image data captured using the camera function as a memory image and whether to share the image data registered as a memory with other users. The replay conditions setting area 180*b3* is an area for setting under which conditions the memory images captured in the past and stored in the information server 300 are to be selected and replayed and displayed. As specific selection conditions, based on current terminal information (current date and time information, current location information, current direction angle information, and the like) acquired by the mobile information terminal 100, memory images matching the imaging conditions related thereto are selected. In addition, it is also possible to acquire image data registered as memories by other users (friends) and replay and display the image data. The user only has to check the item of the desired conditions on the memory control setting screen 180*b*. In addition, by tapping "details" keys displayed in the registration conditions setting area 180*b2* and the replay conditions setting area 180*b3*, detailed conditions can be input for each setting item.

Each piece of information input to the login setting area 180*b1* is stored in the identification information storage area 1011 of the storage unit 110. Each piece of information input to the registration conditions setting area 180*b2* and the replay conditions setting area 180*b3* is stored in the various information storage area 1019 of the storage unit 110.

FIG. 4B is a diagram illustrating detailed settings in the registration conditions setting area 180*b2*. Here, a case will be described in which the user checks the item "Share image" to share image data registered as a memory image with other users.

In the item "Share image", it is possible to select "Share with registered user" or "Share with all users", that is, the disclosure level of the image, for the registered image data. In the former case of "Share with registered user", the disclosure level is restricted, and a user who is allowed to share image data is further registered (set) as a setting range. User registration is designated by e-mail address information, login name information for logging in to the information server 300, and the like. On the other hand, in the latter case of "Share with all users", all users who log in to the information server 300 can share the image data.

FIG. 4C is a diagram illustrating detailed settings in the replay conditions setting area 180*b3*. Here, the conditions under which the memory images stored in the information server 300 are replayed and displayed are set in detail.

When the item "Replay according to date and time" is checked, the detailed conditions of date and time are set separately for "Year", "Month", "Day", and "Time". In the case of replay according to "Year", whether to replay only images captured in the same year as the current date and time or to replay images captured X years or more before the current date and time can be further selected as a setting range. In the case of replay according to "Month", whether to replay only images captured in the same month as the current date and time or to replay images captured within X months before and after the same month as the current date and time can be further selected. In the case of replay according to "Day", whether to replay only images captured on the same day as the current date and time or to replay images captured within X days before and after the same day as the current date and time can be further selected. In the case of replay according to "Time", replaying memory images captured within X minutes before and after the same time as the current time can be further set. In addition, the conditions of "Year", "Month", "Day", and "Time" for date and time may be a single condition or a combination of a plurality of conditions.

When the item "Replay according to location" is checked, "current location" or "designated location" is separately set as detailed conditions. In the case of replay according to "Current location", an X value can be further set so as to replay an image captured at a location within X m east-west and/or north-south from the current location of the mobile information terminal 100. In the case of replay according to "Designated location", the designated location is further set by latitude/longitude, and the X value is set so as to replay an image captured at a location within X m east-west and/or north-south from the designated location. Alternatively, the X value may be designated by the latitude/longitude change width. The X value may be designated within a radius X m from the designated location.

When the item "Replay according to direction angle" is checked, "Direction angle" or "When facing the direction of the target" is separately set as detailed conditions. In the case of replay according to "Direction angle", the X value can be further set so as to replay an image in which the angle difference between a direction angle, at which the mobile information terminal 100 is currently directed, and a direction angle, at which the mobile information terminal 100 was directed at the time of capturing in the past, is within ±X°. In the case of replay according to "When facing the direction of the target", when the mobile information terminal 100 faces the direction of the target (subject) in the image captured in the past, the image including the target is replayed. Also in this case, the X value can be set so as to replay an image in which the angle difference is within ±X°.

When the item "Replay friend image" is checked, "Specific users" or "All users" is separately set as detailed conditions. In the case of replaying images of "Specific users", which user's captured images are to be replayed is further set. For the user setting, e-mail address information or login name information for logging in to the information server 300 is used. In addition, "Specific users" may be the same as the users registered in the item "Share image" in FIG. 4B. In the case of replaying the images of "All users", the images of all users registered in the information server 300 are targets to be replayed.

In addition, the above-described setting conditions (date and time, location, direction angle, and friend image) for replay and display may be used alone or in combination. When a plurality of setting conditions are combined, the replay conditions can be more appropriately narrowed down using a logic expression, such as a logic sum (OR) and a logic product (AND). Therefore, since it is possible to set replay conditions according to the user's preference not only by just the imaging date and time but also by combining the conditions of the imaging location or the imaging direction therewith, it is possible to present a memory image that effectively recalls the situation or impression at the time of capturing by the user.

In addition, in "Replay according to direction angle", replaying an image including a target "When facing the direction of the target" is a particularly unique process in the present embodiment, and the calculation method will be described below.

Figure 4D:
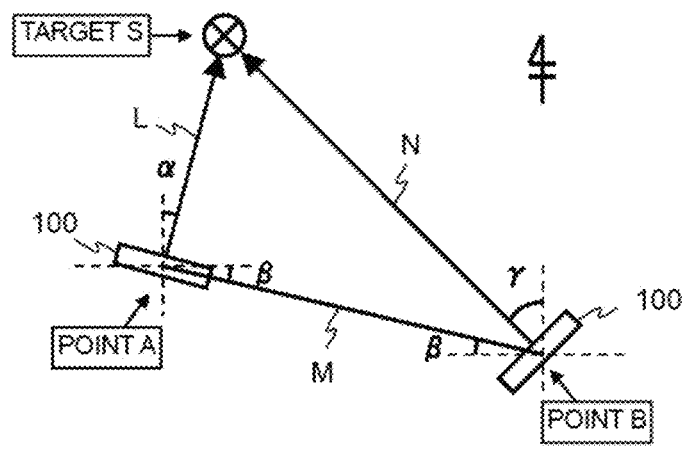
FIG. 4D is a diagram for describing a method of calculating the direction of a target.

FIG. 4D is a diagram illustrating a method of calculating the direction of a target viewed from a mobile information terminal.

It is assumed that a user imaged a target S at a point A using the mobile information terminal 100 and stored the captured image in the information server 300 as a memory image in the past. At this time, it is assumed that the distance between the mobile information terminal 100 and the target S was L and the direction angle at which the mobile information terminal 100 was directed was α. In addition, the distance L is measured by the distance information acquisition unit 1103D of the information acquisition unit 1103. These pieces of imaging-related information (location information of the point A, the imaging direction angle α, and the distance L) are stored in the information server 300 together with the captured image data of the target S.

On the other hand, a direction of the location of the target S in a case where the user is currently at a point B will be described. From the location information acquired at the point A and the location information acquired at the point B, a distance M and an angle β between AB can be calculated. From these pieces of information (distance L, distance M, angle α, and angle β), a direction angle γ at which the target S is viewed from the point B and a distance N from the point B to the target S can be calculated by triangulation. That is, when the user is currently at the point B, if the direction angle at which the mobile information terminal 100 is directed is the calculated direction angle γ (or within ±X° thereof), it can be determined that the mobile information terminal 100 faces the direction of the target S.

[Memory Image Registration Process]

Hereinafter, a memory image registration process will be described in which an image of a subject is captured using the mobile information terminal 100 and the captured image data is registered and stored in the information server 300 as a memory image together with related information.

Figure 5A:
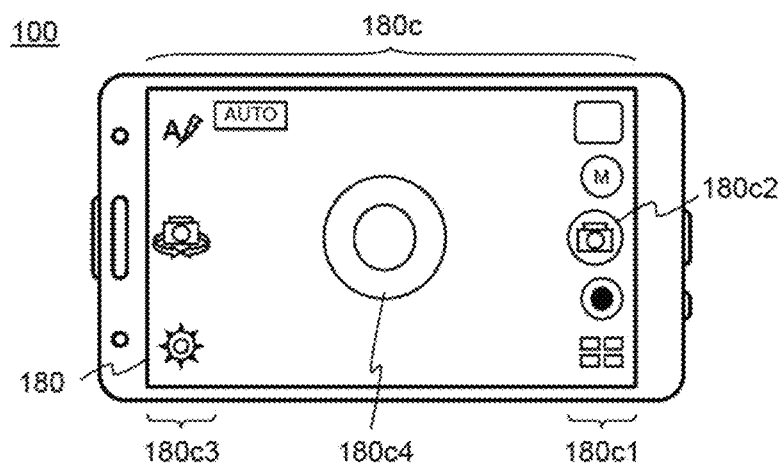
FIG. 5A is a diagram illustrating a camera function screen of the mobile information terminal.

FIG. 5A is a diagram illustrating an example of a camera function screen of the mobile information terminal 100. When the user taps a camera function application icon displayed on the home screen 180a in FIG. 2B, a camera function screen 180c is displayed on the touch screen 180. The camera function screen 180c includes a camera control key area 180c1, a camera setting key area 180c3, and a focus position display mark 180c4, and image data input from the first image input unit (in-camera) 133 or the second image input unit (out-camera) 134, which is a camera unit, is superimposed and displayed on the touch screen 180. A shutter key 180c2 is provided in the camera control key area 180c1. In addition, switching between camera units is performed by tapping a camera switching key prepared in the camera setting key area 180c3.

FIG. 5B is a flowchart illustrating the memory image registration process. This process is mainly controlled by the image registration unit 1104A of the memory image control unit 1104.

First, the user gives an instruction to activate the camera function application by operating the home screen 180a displayed on the mobile information terminal 100. Specifically, the main function icon or the icon of the camera function application displayed in the general icon display areas 180a1 and 180a2 in FIG. 2B is tapped. The basic operation unit 1101 checks the registration conditions setting area 180b2 in FIG. 4A, and delegates the control subject to the image registration unit 1104A of the memory image control unit 1104 according to the user's instruction. The image registration unit 1104A activates the imaging function unit 1102 (S101). The imaging function unit 1102 activates, for example, the second image input unit (out-camera) 134 of the camera units, and starts inputting image data from the second image input unit 134. In addition, as illustrated in FIG. 5A, the imaging function unit 1102 displays the camera function screen 180c on the touch screen 180 (display unit 131) together with the image data input from the second image input unit 134 (S102).

Subsequently, the basic operation unit 1101 checks whether or not an operation instruction has been input by a user's touch operation on the touch screen 180 (touch panel 123), and notifies the image registration unit 1104A of the check result (S103). If there is no operation instruction input to the touch screen 180, the process waits until an instruction is received. If there is an operation instruction input to the touch screen 180, the type of the operation instruction is checked (S104).

If the type of the operation instruction checked in S104 is an instruction to end the camera function application, the process proceeds to S105 in which the image registration unit 1104A ends the operation of the imaging function unit 1102 and returns the control subject to the basic operation unit 1101. The basic operation unit 1101 displays the home screen 180a on the touch screen 180 (S106).

If the type of the operation instruction checked in S104 is a shutter operation, the process proceeds to S107 in which the imaging function unit 1102 starts an acquisition sequence of image data input from the second image input unit 134. First, the imaging function unit 1102 acquires image data from the second image input unit 134 and stores the image data in the temporary storage area 1200 of the RAM 104 (3107). The image data acquisition processing includes pre-processing such as focusing or exposure, processing for converting the output of an electronic device, such as a CCD or CMOS sensor, into digital data, and post-processing such as gamma correction, noise removal, and image compression. Then, the image registration unit 1104A requests the information acquisition unit 1103 to acquire various kinds of information (such as date and time information) at the time of imaging.

In response to the request, the date and time information acquisition unit 1103A acquires imaging date and time information (year, month, day, hour, minute, and second) when the image data was acquired (S108). The location information acquisition unit 1103B acquires imaging location information (longitude and latitude) of the mobile information terminal 100 when the image data was acquired (S109). The direction angle information acquisition unit 1103C acquires information of the imaging direction angle at which the mobile information terminal 100 was directed when the image data was acquired (S110). In addition, the distance information acquisition unit 1103D acquires information of the subject distance to the imaging target (subject) (S111).

Then, it is determined whether or not to register the captured image data as a memory image (S112). Whether or not to register the captured image data as a memory image can be selected by the user by setting the memory control application illustrated in FIG. 4A. Alternatively, the setting may be made from the user menu or the like.

If it is determined in S112 that the captured image data is to be registered as a memory image, the process proceeds to S113 in which the image registration unit 1104A generates related information at the time of imaging related to the image to be registered. The related information at the time of imaging includes user identification information by which the user of the mobile information terminal 100 can be identified (or terminal identification information by which the mobile information terminal 100 can be identified), various kinds of information (date and time information, location information, direction angle information, and distance information) at the time of imaging acquired by the information acquisition unit 1103, and disclosure level setting information set in the item "Share image" of the registration conditions setting area 180b2 of the memory control setting screen 180b. In addition, the image registration unit 1104A transmits the image data acquired in the processing of S107 and the related information at the time of imaging generated in the processing of S113 to the information server 300 through the communication unit 160 and the network (the Internet) 200 (S114).

In the information server 300, the image data and the related information at the time of imaging that have been transmitted are stored in the image data storage area 3011 and the related information storage area 3012 so as to be associated with each other. In addition, the image data acquired in the processing of S107 and the related information at the time of imaging generated in the processing of S113 may be stored together in the various information storage area 1019 of the storage unit 110 in the mobile information terminal 100. Then, the process returns to S103 to repeat the above-described processing.

On the other hand, if it is determined in S112 that the captured image data is not to be registered as a memory image, the process proceeds to S115 to perform a normal imaging process. The image registration unit 1104A generates an image file from the image data acquired in S107 and the various kinds of information (date and time information, location information, direction angle information, and distance information) at the time of imaging acquired in S108 to S111 (S115). This image file may have a known EXIF (exchangeable image file format) format or the like. In addition, the image registration unit 1104A stores the image file generated in S115 in the various information storage area 1019 of the storage unit 110 (S116). Then, the process returns to S103 to repeat the above-described processing.

Even if it is determined in S112 that the captured image data is not to be registered as a memory image, the image data acquired at that time and the various kinds of information at the time of imaging are stored in the storage unit 110. Accordingly, thereafter, the user can transmit the image to the information server 300 as a memory image to additionally register the image. In addition, the processing of S115 and S116 may be performed by the imaging function unit 1102 as a control subject instead of the image registration unit 1104A.

[Information Server Database]

The image data of the memory image and the related information at the time of imaging that have been transmitted from the mobile information terminal 100 are stored in the image data storage area 3011 and the related information storage area 3012 by the information management unit 3101 of the information server 300. Here, how these pieces of data are stored will be described.

FIG. 6A is a diagram illustrating an example of an image database stored in the image data storage area 3011 of the information server 300. The configuration of the image database is divided into folders for each piece of user identification information by which the user of the mobile information terminal 100 can be identified, and the image data transmitted from the mobile information terminal 100 is stored in the corresponding folder. Each of these folders is managed by login name information of a user database (FIG. 6B) and user identification information of a related information database (FIG. 6C) described below. In addition, each piece of image data in the folder is managed by a file name corresponding to the image identification information in the related information database.

FIG. 6B is a diagram illustrating an example of a user database stored in the related information storage area 3012 of the information server 300. The user database is a database for storing a list of users who use the information storage/presentation service, and information such as a login name, a password, a name, an e-mail address, and a contact number are registered in the user database. Other pieces of information, such as address information and credit card information, may be further registered.

The login name is identification information for identifying a user who uses the information storage/presentation service, and is used when logging in to the information storage/presentation service. The login name is uniquely determined for each user. The password is authentication information used for user authentication when logging in to the information storage/presentation service. Each user can arbitrarily designate a password. The name is information on the name of the user who uses the information storage/presentation service. The e-mail address and the contact number are information regarding contact information for each user who uses the information storage/presentation service, and are used when making various kinds of contact. In the login setting area 180a1 illustrated in FIG. 4A, login is performed by inputting a login name and a password.

FIG. 6C is a diagram illustrating an example of a related information database stored in the related information storage area 3012 of the information server 300. The related information database is a database for storing related information at the time of imaging that is related to each piece of image data transmitted from the mobile information terminal 100.

The image identification information is identification information by which each piece of image data transmitted from the mobile information terminal 100 can be identified. The user identification information is user identification information by which a person who has captured (registered) each piece of image data can be identified, and a login name of a user database (FIG. 6B) is used. Image data can be uniquely identified by combining the image identification information and the user identification information. The imaging date and time information is imaging date and time information of each piece of image data transmitted from the mobile information terminal 100. Similarly, imaging location information, imaging direction angle information, and subject distance information (not illustrated) of each piece of image data are registered corresponding to the image identification information. In addition, information such as terminal identification information, by which the mobile information terminal can be identified, or disclosure level setting information may be registered.

[Memory Image Replay Process]

Hereinafter, a memory image replay process will be described in which a memory image captured in the past and stored in the information server 300 is searched for and acquired according to the current status of the mobile information terminal 100 and the memory image is replayed and displayed on the mobile information terminal 100.

FIGS. 7A and 7B are flowcharts illustrating the memory image replay process. FIG. 7A illustrates a process on the mobile information terminal 100 side, and FIG. 7B illustrates a process on the information server 300 side.

First, an image replay process on the mobile information terminal 100 will be described with reference to FIG. 7A. The following process is controlled by the image request unit 1104B of the memory image control unit 1104. In addition, whether or not to execute the memory image replay process can be selected by setting of the memory control application. Alternatively, the setting may be made from the user menu or the like. When the memory image replay process is set to be executed, the process flow illustrated in FIG. 7A always operates.

In S201, the image request unit 1104B of the memory image control unit 1104 generates memory image search conditions (hereinafter, referred to as image search conditions) describing the user identification information of the mobile information terminal 100 and the replay conditions set in the replay conditions setting area 180b3 of the memory control setting screen 180b. In addition, the image request unit 1104B transmits the image search conditions generated in the processing of S201 to the information server 300 through the communication unit 160 and the network 200 (S202). The transmitted image search conditions are stored in the related information storage area 3012 of the information server 300.

Then, the image request unit 1104B requests the information acquisition unit 1103 to acquire the current status (date and time information and the like) of the terminal. In response to this, the date and time information acquisition unit 1103A acquires the current date and time information (S203), and the location information acquisition unit 1103B acquires the current location information of the mobile information terminal 100 (S204). In addition, the direction angle information acquisition unit 1103C acquires information of the direction angle at which the mobile information terminal 100 is currently directed (S205).

Then, in S206, the image request unit 1104B generates information of the current terminal state (hereinafter, referred to as current terminal information) from the current date and time information, the current location information, and the current direction angle information acquired by the information acquisition unit 1103 and the user identification information of the mobile information terminal 100. In addition, the image request unit 1104B transmits the current terminal information generated in S206 to the information server 300 through the communication unit 160 and the network 200 (S207).

In response to this, as will be described later in FIG. 7B, the information server 300 searches for corresponding image data from the database based on the image search conditions (S202) and the current terminal information (S207) transmitted from the mobile information terminal 100, and transmits the image data to the mobile information terminal 100 as a memory image together with related information at the time of imaging.

In S208, the image request unit 1104B of the mobile information terminal 100 determines whether a memory image and related information have been received from the information server 300. When the memory image and the related information are received, the operation state of the display unit 131 of the mobile information terminal 100 is determined (S209), and memory image display processing (S210) or memory image notification processing (S211) is executed. The processing of S210 and S211 is mainly controlled by the image display unit 1104C of the memory image control unit 1104.

If it is determined in S209 that the display unit 131 is operating (screen display is being performed), the image display unit 1104C determines that the user is using the mobile information terminal 100. In this case, the process proceeds to S210 in which the image display unit 1104C displays the received memory image on the display unit 131. Details of the memory image display method will be described later. Thereafter, the process proceeds to S212.

If it is determined in 3209 that the display unit 131 is not operating (screen display is not performed), the image display unit 1104C determines that the user is not using the mobile information terminal 100. In this case, the process proceeds to 3211 in which the image display unit 1104C outputs a notification sound, which is for notifying that the memory image has been received from the stereo speaker 143, or vibrates the housing of the mobile information terminal 100 using a vibrator (not illustrated). Therefore, the user can know that the memory image has been received.

On the other hand, if it is determined in S208 that a memory image and related information have not been received from the information server 300 (or when the fact that there is no image data to be replayed is received from the information server 300), the process proceeds to 3212. In 3212, the image request unit 1104B checks whether or not the replay conditions set in the replay conditions setting area 180b3 of the memory control setting screen 180b have been updated. If the replay conditions have been updated, the process returns to S201 to repeat the processing. If the replay conditions have not been updated, the process returns to S203 to repeat the processing.

FIG. 7B illustrates an image search process of the information server 300. The related information storage area 3012 of the information server 300 stores the memory image search conditions (hereinafter, image search conditions) transmitted from the mobile information terminal 100 in S202 of FIG. 7A. The following process is mainly controlled by the image search unit 3102.

In S301, the information server 300 receives current terminal information (current date and time information, current location information, current direction angle information, and user identification information) from the mobile information terminal 100 (corresponding to S207 in FIG. 7A). The image search unit 3102 acquires the user identification information of the mobile information terminal 100 as a transmission source from the received current terminal information. Then, among the image search conditions transmitted from the mobile information terminal 100 in advance, image search conditions corresponding to the user identification information are checked (S302).

Then, in S303, the image search unit 3102 determines whether or not there is an image matching the image search conditions with reference to the related information database stored in the related information storage area 3012. This determination is performed by comparing the current terminal information (current date and time information, current location information, current direction angle information, and user identification information) received in S301 with the related information (date and time information, location information, direction angle information, and distance information) at the time of imaging registered in the related information database and referring to the replay conditions described in the image search conditions. A specific example will be described later. If there is an image matching the search conditions, the process proceeds to S304, and if there is no image matching the search conditions, the process ends.

In S304, it is determined whether or not an image matching the search conditions (hereinafter, a corresponding image) is an image registered by the user of the mobile information terminal 100. In this determination, the user identification information acquired from the current terminal information may be compared with the user identification information of the corresponding image data registered in the related information database. As a result of the determination, if the corresponding image is an image registered by the user of the mobile information terminal 100, the process proceeds to S306. If the corresponding image is not image data registered by the user of the mobile information terminal 100, the process proceeds to S305.

In S305, it is determined whether or not the corresponding image data is allowed to be shared by the user identified by the user identification information acquired from the current terminal information. In this determination, the user identification information acquired from the current terminal information may be compared with the information of the disclosure level setting of the corresponding image data in the related information database. As a result of the determination, if it is determined that the corresponding image data is allowed to be shared by the identified user, the process proceeds to S306. If it is determined that the image data is not allowed to be shared by the identified user, the process ends.

In S306, the image search unit 3102 acquires the corresponding image data from the image database of the image data storage area 3011 based on the image identification information of the corresponding image data. In addition, the image search unit 3102 transmits the acquired image data to the mobile information terminal 100 as a memory image together with the related information at the time of imaging registered in the related information database (S307).

In this manner, the information server 300 can search for an image matching the search conditions from the image database based on the memory image search conditions set by the mobile information terminal 100 and transmit the image to the mobile information terminal 100 as a memory image.

[Specific Example of Memory Image Search Process]

The memory image search process illustrated in FIG. 7B will be specifically described with registered data described in FIGS. 6A to 6C as an example. In this image search process, the current terminal information (current date and time information, current location information, and current direction angle information) acquired from the mobile information terminal 100 is compared with the data of the imaging conditions registered in the related information database of FIG. 6C, and a corresponding image is searched for by referring to the replay conditions (FIG. 4C) described in the memory image search conditions.

Search Example 1

When the current date and time information of the terminal is "Oct. 1, 2017, 13:25:15" and the replay conditions are set to "Replay memory images based on year" and "Replay memory images captured two years or more before the current date and time", image data "img_000001" and image data "img_000002" are extracted.

Search Example 2

When the current date and time information of the terminal is "Oct. 1, 2017, 13:25:15" and the replay conditions are set to "Replay memory images based on year" and "Replay memory images captured two years or more before the current date and time" and set to "Replay memory images based on month" and "Replay memory images captured within one month before and after", image data "img_000002" is extracted.

Search Example 3

When the current date and time information of the terminal is "Oct. 1, 2017, 13:25:15" and the replay conditions are set to "Replay memory images based on time" and "Replay memory images captured within 15 minutes before and after", image data "img_000001" and image data "img_000027" are extracted.

Search Example 4

When the current location information of the terminal is "35.4030/139.5329" and the replay conditions are set to "Replay memory images based on current location" and "Replay memory images captured with a latitude and/or longitude error of 0.0010 or less", image data "img_000002" and image data "img_000027" are extracted.

Search Example 5

When the replay conditions are set to "Replay memory images based on designated location", "Designated location=35.4050/139.5320", and "Replay memory images captured with a latitude and/or longitude error of 0.0010 or less", image data "img_000003" is extracted regardless of the current location information of the mobile terminal.

Search Example 6

When the current direction angle information of the terminal is "192°" and the replay conditions are set to "Replay memory images based on direction angle" and "Replay only memory images captured with a direction angle difference of ±5° or less", image data "img_000003" is extracted.

Search Example 7

When the current date and time information of the terminal is "Oct. 1, 2017, 13:25:15", the current location information of the terminal is "35.4030/139.5329", and the replay conditions are set to "Replay memory images based on year" and "Replay memory images captured two years or more before the current date and time", set to "Replay memory images based on month" and "Replay memory images captured within one month before and after", and set to "Replay memory images based on current location" and "Replay memory images captured with a latitude and/or longitude error of 0.0010 or less", image data "img_000002" is extracted.

Search Example 8

When the current direction angle information of the terminal is "5°" and the replay conditions are set to "Replay when facing the direction of the target", the direction angle γ of the target is calculated from the current location according to the procedure illustrated in FIG. 4D for each piece of image data. When there is image data in which the angle difference between the calculated direction angle γ and the current direction angle δ is within a predetermined value (X°), the corresponding image data is extracted. In addition, in the calculation of the direction angle γ, the current location information and the imaging conditions (location information, direction angle information, and distance information) registered in the related information database are used.

Search Example 9

When the replay conditions are "Replay memory images of a specific user" and the e-mail address of "USER000002" is registered, image data "img_000001" registered by "USER000002" is extracted (only when "USER000002" allows "USER000001" to share memory images).

In the above search examples, a case where the current direction angle information of the mobile information terminal is used and the replay conditions are "Replay memory images based on direction angle" (Search Example 6) and a case where the current direction information of the mobile information terminal is used and "Replay when facing the direction of the target" (Search Example 8) are particularly unique processes.

<Display of Memory Image>

The image display method in the memory image display processing (S210) of FIG. 7A will be specifically described. The mobile information terminal 100 displays a memory image received from the information server 300, but related information at the time of capturing the corresponding image is also transmitted together from the information server 300. The image display unit 1104C that has received this compares the related information at the time of capturing the image to be displayed with the current status (current terminal information) of the mobile information terminal 100, and performs display control based on the degree of matching between the pieces of information. Hereinafter, some display examples are shown.

Display Example 1

Figure 8A:
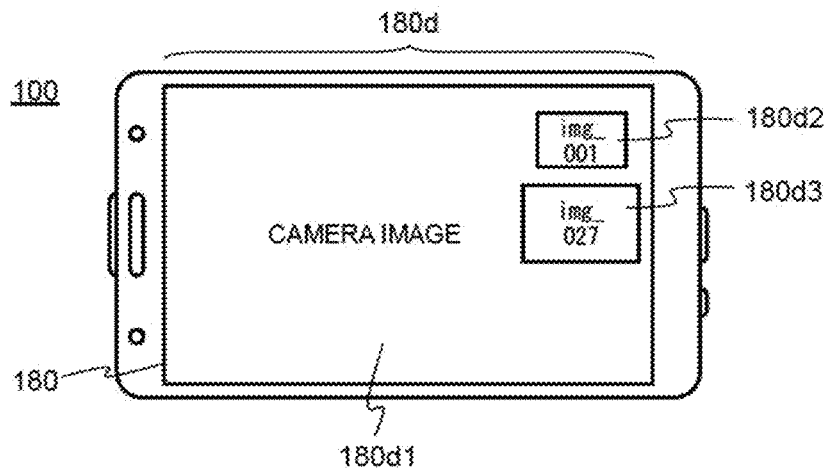
FIG. 8A is a diagram illustrating an example of a memory image display screen (Display Example 1).

FIG. 8A illustrates a display screen corresponding to the search result of <Search Example 3> described above. When the current date and time information of the mobile information terminal 100 is "Oct. 1, 2017, 13:25:15" and the replay conditions are "Replay memory images based on time", the extracted two pieces of image data "img_000001" and "img_000027" and their related information are received from the information server 300. In this case, the image display unit 1104C displays the received two pieces of image data "img_000001" and "img_000027" as pieces of image data 180d2 and 180d3, respectively, so as to be superimposed on image data (hereinafter, a camera image) 180d1 input from the second image input unit 134.

In this display, the display sizes of the image data 180d2 and the image data 180d3 are changed, so that the image data 180d3 is displayed larger. Here, the current date and time information is compared with the related information (imaging date and time information) of each piece of image data, and the size is controlled according to the degree of matching. That is, in this example, the current time information (13:25:15) is compared with the time information of each piece of image data, and the image data 180d3 "img_000027" (13:22:53) having the smaller error is displayed larger, and the other image data 180d2 "img_000001" (13:36:41) is displayed smaller.

Display Example 2

Figure 8B:
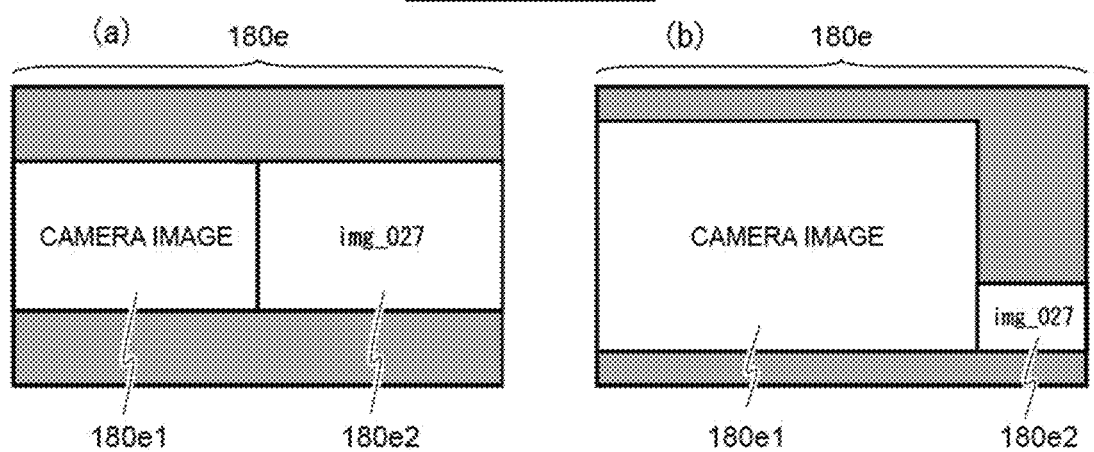
FIG. 8B is a diagram illustrating an example of a memory image display screen (Display Example 2).

FIG. 8B illustrates a display screen corresponding to the search result of <Search Example 4> described above. When the current location information of the mobile information terminal 100 is "35.4030/139.5329" and the replay conditions are "Replay memory images based on current location", the extracted two pieces of image data "img_000002" and "img_000027" and their related information are received from the information server 300. In this case, instead of displaying the two pieces of image data, the related information (imaging location information) of each piece of image data is compared with the current location information, and image data with a larger degree of matching (smaller error) is selected and displayed. In this example, the image data of "img_000027" (imaging location information is "35.4031/139.5330") is selected, and displayed as image data (memory image) 180e2 side by side with image data (camera image) 180e1 input from the second image input unit 134.

At this time, the display ratio between the image data (camera image) 180e1 and the image data (memory image) 180e2 is changed according to the degree of matching between the imaging location information of the selected image data "img_000027" and the current location information. FIG. 8B (a) illustrates a case where the error between two pieces of image data is small (the degree of matching is large) and the display ratio of the image data (memory image) 180e2 is increased. FIG. 8B (b) illustrates a case where the error between the two pieces of image data is large (the degree of matching is small) and the display ratio of the image data (memory image) 180e2 is reduced.

In addition, when the user moves and the current location information of the mobile information terminal 100 is updated, the display ratio is also controlled to be updated according to the current location.

Display Example 3

Figure 8C:
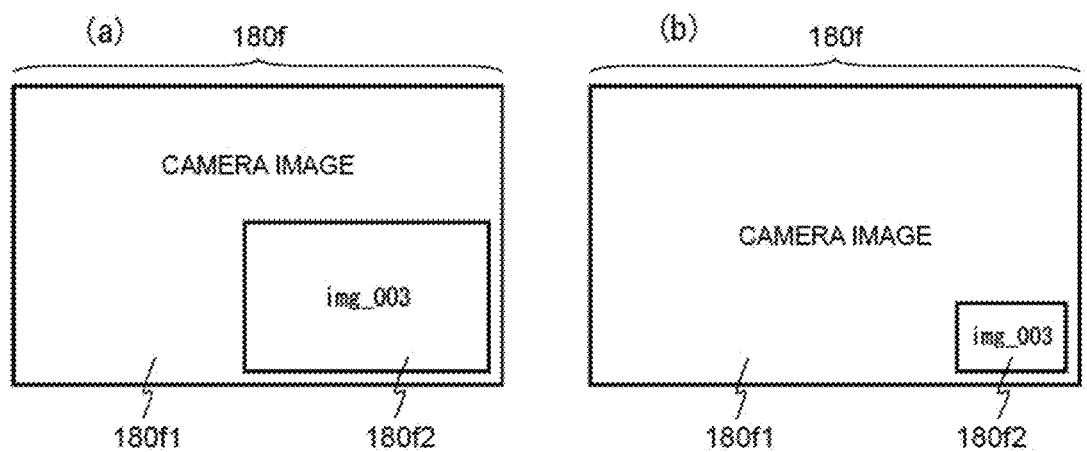
FIG. 8C is a diagram illustrating an example of a memory image display screen (Display Example 3).

FIG. 8C illustrates a display screen corresponding to the search result of <Search Example 6> described above. When the current direction angle information of the mobile information terminal 100 is "192°" and the replay conditions are "Replay memory images based on direction angle", the extracted one piece of image data "img_000003" and its related information are received from the information server 300. In this case, the received image data "img_000003" is displayed as image data (memory image) 180f2, so as to be superimposed on image data (camera image) 180f1 input from the second image input unit 134.

In addition, the display size of the image data (memory image) 180f2 is controlled according to the degree of matching between the related information of the corresponding image data and the current status (current date and time information, current location information, current direction angle information, and the like) of the mobile information terminal 100. In this example, the imaging direction angle information (195°) of "img_000003" is compared with the current direction angle information (192°). FIG. 8C (a) illustrates a case where the degree of matching is large (the error is small) and the image data 180f2 is displayed large. FIG. 8C (b) illustrates a case where the degree of matching is small (the error is large) and the image data 180f2 is displayed small.

<Display Example 3> in FIG. 8C can also be applied to a case where the search result of <Search Example 8> described above is displayed. When the current direction angle information of the mobile information terminal 100 is "δ°" and the replay conditions are set to "Replay when facing the direction of the target", image data (memory image) in which the direction angle γ of the target is close to the current direction angle δ is received. Also in this case, as illustrated in FIG. 8C, the received image data (memory image) is displayed as the image data 180f2.

In this case, the display size of the image data 180f2 is determined by comparing the direction angle γ of the target with the current direction angle δ. If the error is small, the image data 180f2 is displayed large as illustrated in (a). If the error is large, the image data 180f2 is displayed small as illustrated in (b). Alternatively, if the calculated distance N to the target is small, the image data 180f2 may be displayed large, and if the distance N to the target is large, the image data 180f2 may be displayed small.

Thus, according to <Display Example 3>, when the current direction angle of the mobile information terminal 100 held by the user changes, the size of a memory image to be displayed changes according to the degree of matching with the direction angle at the time of imaging (or the direction angle of the target). Then, when facing the direction angle (or the direction angle of the target) when the corresponding memory image was captured, the corresponding memory image is displayed in a maximum size, so that the user can effectively recall the memories at the time of imaging.

In addition, in the display control described above, the size of the memory image is changed and displayed according to the degree of matching between the current status of the terminal and the related information at the time of imaging. However, images may be displayed with different degrees of transparency according to the degree of matching.

In addition, in the display examples described above, control may be performed such that a full-screen display is performed when one of memory images being displayed is selected by a user operation instruction. Alternatively, control may be performed such that the display ratio between the selected image and the camera image or the like is switched.

In addition, in <Display Examples 1 and 3>, when the mobile information terminal 100 is an HMD including a transmissive display, the camera images 180d1 and 180f1 may be surrounding landscapes transmitted through the display. In that case, the memory images 180d2 and 180f2 may be displayed so as to be superimposed on the surrounding landscape.

As described above, the mobile information terminal 100 according to the present embodiment acquires an image that is closely related to the current status (date and time, location, orientation, and the like) of the terminal, among memory images captured by the user in the past and registered in the information server 300, and displays the image so as to be superimposed on the current surrounding landscape or side by side with the current surrounding landscape. At this time, the size or the degree of transparency of a displayed image is controlled and displayed according to the degree of matching between the current status of the terminal and the related information at the time of imaging. Therefore, since images that are particularly related to the current status are highlighted, the user can effectively recall the memories.

<Viewing Device Capable of Performing VR Display>

Here, as a usage form of the mobile information terminal 100, a viewing device that can be mounted on the user's head to display VR (virtual reality) or the like will be described.

FIG. 9A is a diagram illustrating a use state in which the mobile information terminal 100 is inserted into a viewing device (adapter) 10 and a user 1 wears the viewing device. (a) is a top view of the user 1 wearing the viewing device 10 when viewed from directly above, and (b) is a front view of the user 1 wearing the viewing device 10 when viewed from the front. By using such a viewing device 10, the same function as an HMD (head mounted display) can be realized. Alternatively, instead of the viewing device 10, the user 1 may hold and use the mobile information terminal 100 with both hands or one hand so that the mobile information terminal 100 is disposed in front of the user.

The viewing device 10 has a configuration in which the mobile information terminal 100, such as a smartphone or a tablet terminal, is inserted into a slit unit 20 and supported. The user 1 places the viewing device 10, in which the mobile information terminal 100 is inserted, in front of his or her eyes, and fixes the viewing device 10 to the head using a belt or the like. The display screen (display unit 131) of the mobile information terminal 100 can perform VR (virtual reality) display, MR (mixed reality) display, or the like in which an artificial object created by CG (computer graphics) or the like is superimposed on image data (camera image) input from the second image input unit 134. In addition, in the case of an HMD having a transmissive display, it is possible to perform AR (augmented reality) display or the like in which an artificial object created by CG or the like is superimposed on the surrounding landscape.

An image displayed on the display screen of the mobile information terminal 100 is incident on the eyes of the user 1 through a lens unit 11 disposed inside the viewing device 10. In addition, a partition unit 12 prevents mixing of images that have passed through the left and right lens units 11. In addition, the above-described slit unit 20, lens unit 11, partition unit 12, and the like are for describing the internal structure of the viewing device 10, and are not normally exposed to the outside. In addition, it is preferable that the mobile information terminal 100 is covered with a part of the housing of the viewing device 10, such as a lid, in a normal state, to prevent the mobile information terminal 100 from falling or shifting even when the head of the user 1 moves up, down, left, or right. In addition, a window 13 is provided in the housing of the viewing device 10, so that the second image input unit 134 provided on the back surface of the mobile information terminal 100 is exposed.

FIG. 9B is a diagram illustrating a change in the user's line of sight and the orientation of the mobile information terminal 100 when the user 1 moves his or her head. (a) is a top view of the user 1 when viewed from directly above. When the user 1 wearing the viewing device 10 moves his or her head to the left or right (horizontally) around the center of the head, the mobile information terminal 100 inserted into the viewing device 10 moves from a location 100a to a location 100b. In this case, a direction in which the mobile information terminal 100 is directed at the location 100a is Da, a direction in which the mobile information terminal 100 is directed at the location 100b is Db, and the relative angle difference is δ. In addition, (b) is a diagram illustrating a change (Da→Db) in the orientation of the mobile information terminal 100 in (a) with the center position of the mobile information terminal 100 fixed.

Here, a case where the control of <Display Example 3> in FIG. 8C is performed using the viewing device in FIGS. 9A and 9B will be described. When the direction angle at which the mobile information terminal 100 is currently directed is the direction Db and the direction of the target is Da, the size of the image data 180/2 is controlled according to the magnitude of the angle difference δ. In addition, the degree of transparency of the image data 180/2 may be changed according to the magnitude of the angle difference δ. In addition, when the user 1 moves his/her head to the left or right (horizontally) to update the current direction angle information of the mobile information terminal 100 or when the user 1 moves to update the current location information of the mobile information terminal 100, the size of the display is also controlled so as to be appropriately updated.

Modification Example 1

The image data registered in the image database of the information server 300 may not be image data captured by the mobile information terminal 100 and uploaded through the network 200. For example, a store manager creates and registers an advertisement image of the store on a PC. At this time, in the related information at the time of imaging registered in the related information database, a special sale date of the store or the like is registered as imaging date and time information, latitude/longitude information before the front entrance of the store is registered as imaging location information, and direction angle information when directing to the front entrance of the store from the location in front of the front entrance of the store is registered as imaging direction angle information. In addition, "Share with all users" is selected as a setting of "Share image" item of the disclosure level setting.

Then, when an arbitrary user directs the mobile information terminal 100 to the front entrance side of the store in front of the front entrance of the store managed by the store manager on a day when the special sale date and the information of "Day" match each other, the mobile information terminal 100 can acquire the advertisement image from the information server 300 and display the advertisement image. That is, the store manager can effectively advertise the store by preparing an advertisement image in advance and registering the advertisement image as a memory image.

Modification Example 2

When the image data captured by the mobile information terminal 100 and the related information are registered in the information server 300, other pieces of related data (for example, audio data and text data) are registered at the same time. The related data is registered in a related file database (not illustrated) of the information server 300.

For example, when image data (memory image) is received from the information server 300 in the above-described memory image replay process (FIG. 7A) (S208), the related data is received simultaneously with the image data. Thereafter, when the image data (memory image) is displayed on the display unit 131 (S210), the related data is replayed simultaneously with the image data. In the case of audio data, audio replay software is activated to output audio from a speaker. In the case of text data, the text data is displayed on the display unit 131 by a memo pad application or the like. Alternatively, only the related data may be acquired in the processing of S208, and the processing for replaying the acquired related data may be performed after the image data (memory image) displayed on the display unit 131 is selected by the user operation instruction. By performing such control, it is possible to replay the data related to the image simultaneously with the display of the image data (memory image). Therefore, it is possible to recall the memories more effectively.

As described above, the examples of the embodiment of the present invention has been described. However, it is needless to say that the configuration for realizing the technique of the present invention is not limited to the above-described examples, and various modification examples can be considered. For example, a part of the configuration in one example can be replaced with the configuration in another example, and the configuration in another example can be added to the configuration in one example. These all belong to the scope of the present invention. In addition, numerical values, messages, and the like appearing in sentences or diagrams are merely examples, and the effect of the present embodiment is not affected even if different ones are used.

All or some of the functional blocks of the present invention described above may be realized by hardware, for example, by an integrated circuit. Alternatively, the functional blocks of the present invention may be realized by software in such a manner that a microprocessor unit or the like interprets and executes a program for realizing each function or the like. Hardware and software may be used together. The software may be stored in advance in the ROM 103 or the storage unit 110 of the mobile information terminal 100 at the time of product shipment. After the product is shipped, the software may be acquired from various server devices on the Internet. Alternatively, the software provided through a memory card, an optical disk, or the like may be acquired.

In addition, the control lines or the information lines illustrated in the diagrams are those considered to be necessary for the description, and all control lines and information lines on the product are not necessarily illustrated. In fact, it may be considered that almost all components are interconnected.

REFERENCE SIGNS LIST

10 Viewing device
100 Mobile information terminal
104 RAM
110 Storage unit
131 Display unit
133 First image input unit
134 Second image input unit
150 Sensor unit
160 Communication unit
180 Touch screen
180b Memory image control setting screen
180c Camera function screen
180d to 180f Examples of display screen
200 Network
300 Information server
304 RAM
310 Storage unit
360 LAN communication unit
1102 Imaging function unit
1103 Information acquisition unit
1104 Memory image control unit
3101 Information management unit
3102 Image search unit
3011 Image data storage area
3012 Related information storage area

The invention claimed is:

1. A mobile information terminal that stores captured image data in an information server through a network, acquires image data stored in the information server through the network, and displays the image data as a related image, comprising:

an image input unit to which the captured image data is input;

an information acquisition unit that acquires various kinds of information, which include date and time information, location information, direction angle information, and information of a distance to a subject, as a status of the mobile information terminal;

a communication unit that transmits and receives image data and various kinds of information to and from the information server through the network;

a display unit that displays an input image based on the image data input to the image input unit and/or a related image based on the image data received by the communication unit; and a control unit that controls an operation of each unit of the mobile information terminal, wherein the control unit performs control such that various kinds of information indicating a status of the mobile information terminal at the time of imaging acquired by the information acquisition unit are transmitted together with related information at the time of imaging including user identification information, by which a user of the mobile information terminal is identifiable, when storing the captured image data in the information server; various kinds of information indicating a current status of the mobile information terminal acquired by the information acquisition unit, current terminal information including the user identification information by which the user of the mobile information terminal is identifiable, and image search conditions describing replay conditions set by the user of the mobile information terminal are transmitted to the information server when making a request for the image data stored in the information server; and image data searched for based on the current terminal information and the image search conditions in the information server is acquired and displayed on the display unit as a related image, and wherein, when the related image from the information server and the input image from the image input unit are simultaneously displayed on the display unit, the control unit performs control such that related information at the time of imaging of image data is received together with the image data from the information server, the received related information at the time of imaging is compared with the various kinds of information indicating the current status of the mobile information terminal acquired by the information acquisition unit, and the input image and the related image are displayed on the display unit with different sizes according to a degree of matching between any of the pieces of information.

2. The mobile information terminal according to claim 1, wherein there are a case where the related image and the input image are displayed side by side on the display unit and a case where the related image is displayed on the display unit so as to be superimposed on the input image, and in the case of superimposition, a degree of transparency of the related image is changeable for display instead of a size of the related image.

3. An information presentation system in which image data captured by a mobile information terminal is stored in an information server through a network and image data stored in the information server is acquired through the network by the mobile information terminal and displayed as a related image, wherein the mobile information terminal includes:
an image input unit to which the captured image data is input;
an information acquisition unit that acquires various kinds of information, which include date and time information, location information, direction angle information, and information of a distance to a subject, as a status of the mobile information terminal;
a communication unit that transmits and receives image data and various kinds of information to and from the information server through the network; and
a display unit that displays an input image based on the image data input to the image input unit and/or a related image based on the image data received by the communication unit, wherein the information server includes:
a storage unit that stores image data and various kinds of information transmitted from the mobile information terminal;
an image search unit that searches for corresponding image data from the storage unit in response to a request from the mobile information terminal; and
a communication unit that transmits and receives image data and various kinds of information to and from the mobile information terminal through the network, wherein the mobile information terminal transmits various kinds of information indicating a status of the mobile information terminal at the time of imaging acquired by the information acquisition unit together with related information at the time of imaging including user identification information, by which a user of the mobile information terminal is identifiable, when storing the captured image data in the information server, and transmits to the information server various kinds of information indicating a current status of the mobile information terminal acquired by the information acquisition unit, current terminal information including the user identification information by which the user of the mobile information terminal is identifiable, and image search conditions describing image data replay conditions set by the user of the mobile information terminal when making a request for the image data stored in the information server, wherein the information server searches for corresponding image data from the storage unit based on the current terminal information and the image search conditions received from the mobile information terminal, and transmits the searched image data to the mobile information terminal, and wherein, when the related image from the information server and the input image from the image input unit are simultaneously displayed on the display unit, related information at the time of imaging of image data is received together with the image data from the information server, the received related information at the time of imaging is compared with the various kinds of information indicating the current status of the mobile information terminal acquired by the information acquisition unit, and the input image and the related image are displayed on the display unit with different sizes according to a degree of matching between any of the pieces of information.

4. The information presentation system according to claim 3, wherein, when the replay conditions described in the image search conditions are set to replay when facing a direction of a target, the information server searches for image data, which includes a target present in a direction in which the mobile information terminal is directed, from current location information and direction angle information of the mobile information terminal.

5. The information presentation system according to claim 3, wherein the related information at the time of imaging transmitted from the mobile information terminal includes information of a disclosure level setting of captured image data, and when the searched image data is not stored by the user of the mobile information terminal who makes a request for the image data and the user is not allowed to share an image by the disclosure level setting of the searched image data, the information server does not transmit the searched image data to the mobile information terminal.

6. An information presentation method in which image data captured by a mobile information terminal is stored in an information server through a network and image data stored in the information server is acquired through the network by the mobile information terminal and displayed as a related image, the method comprising:

a step in which, when storing captured image data in the information server, the mobile information terminal transmits various kinds of information, which include date and time information, location information, direction angle information, and information of a distance to a subject indicating a status of the mobile information terminal at the time of imaging, and related information at the time of imaging, which includes user identification information by which a user of the mobile information terminal is identifiable, to the information server together with the captured image data;

a step in which the information server stores the image data and the related information at the time of imaging, which have been transmitted from the mobile information terminal, in a storage unit;

a step in which, when making a request for the image data stored in the information server, the mobile information terminal transmits to the information server various kinds of information indicating a current status of the mobile information terminal, current terminal information including the user identification information by which the user of the mobile information terminal is identifiable, and image search conditions describing image data replay conditions set by the user of the mobile information terminal;

a step in which the information server searches for corresponding image data from the storage unit based on the current terminal information and the image search conditions received from the mobile information terminal and transmits the searched image data to the mobile information terminal; and a step in which the mobile information terminal displays the image data transmitted from the information server on a display unit as a related image, wherein, in the step in which the information server transmits the searched image data to the mobile information terminal, related information at the time of imaging of the image data is transmitted together with the searched image data, and wherein in the step in which the mobile information terminal displays the related image from the information server on the display unit, when the related image and an input image input to an image input unit of the mobile information terminal are simultaneously displayed, the received related information at the time of imaging is compared with the various kinds of information indicating the current status of the mobile information terminal, and the input image and the related image are displayed on the display unit with different sizes according to a degree of matching between any of the pieces of information.

* * * * *